(12) United States Patent
Ernst et al.

(10) Patent No.: US 7,915,367 B2
(45) Date of Patent: Mar. 29, 2011

(54) PROCESS FOR THE MANUFACTURE OF BRANCHED POLYPROPYLENE

(75) Inventors: Eberhard Ernst, Unterweitersdorf (AT); Kimmo Hakala, Helsinki (FI); Petri Lehmus, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 69 days.

(21) Appl. No.: 12/490,482

(22) Filed: Jun. 24, 2009

(65) Prior Publication Data

US 2009/0264606 A1    Oct. 22, 2009

Related U.S. Application Data

(63) Continuation of application No. PCT/EP2007/064384, filed on Dec. 20, 2007.

(30) Foreign Application Priority Data

Dec. 28, 2006 (EP) ................................... 06027007

(51) Int. Cl.
    C08F 110/06    (2006.01)
    C08F 210/06    (2006.01)
    C08F 4/6592    (2006.01)

(52) U.S. Cl. ........ 526/351; 526/129; 526/160; 526/165; 526/348

(58) Field of Classification Search ............... 526/129, 526/160, 165, 348, 351
    See application file for complete search history.

(56) References Cited

U.S. PATENT DOCUMENTS

| | | | |
|---|---|---|---|
| 4,404,342 A | 9/1983 | Miyoshi et al. | |
| 4,483,971 A | 11/1984 | Sato et al. | |
| 4,634,745 A | 1/1987 | Ehrig et al. | |
| 4,701,432 A | 10/1987 | Welborn, Jr. | |
| 4,808,561 A | 2/1989 | Welborn, Jr. | |
| 5,250,631 A | 10/1993 | McCullough, Jr. | |
| 5,326,625 A | 7/1994 | Schuhmann et al. | |
| 5,948,547 A | 9/1999 | Milkielski et al. | |
| 6,086,982 A | 7/2000 | Peiffer et al. | |
| 6,225,432 B1 | 5/2001 | Weng | |
| 6,573,350 B1 * | 6/2003 | Markel et al. ............. | 526/348 |
| 6,805,930 B2 | 10/2004 | Hanada | |
| 7,319,125 B2 * | 1/2008 | Arjunan et al. .......... | 526/127 |
| 7,326,756 B2 * | 2/2008 | Arjunan .................. | 526/127 |
| 2002/0173602 A1 | 11/2002 | Appleyard | |
| 2002/0198318 A1 | 12/2002 | Obata | |
| 2004/0010087 A1 | 1/2004 | Obata | |
| 2004/0072005 A1 | 4/2004 | German | |
| 2005/0090571 A1 | 4/2005 | Mehta | |

FOREIGN PATENT DOCUMENTS

| | | |
|---|---|---|
| DE | 203 915 | 11/1983 |
| DE | 3 539 352 | 5/1986 |
| DE | 198 27 327 | 12/1999 |
| DE | 199 49 235 | 5/2000 |
| EP | 0 36 457 | 9/1981 |
| EP | 0 190 889 | 8/1986 |
| EP | 0 384 431 | 8/1990 |
| EP | 0 887 379 | 12/1990 |
| EP | 0 674 325 | 9/1995 |
| EP | 0 674 991 | 10/1995 |
| EP | 0 690 458 | 1/1996 |
| EP | 0 747 212 | 11/1996 |
| EP | 0 745 637 | 12/1996 |
| EP | 0 873 862 | 10/1998 |
| EP | 0 879 830 | 11/1998 |
| EP | 0 885 918 | 12/1998 |
| EP | 0 893 802 | 1/1999 |
| EP | 0 919 572 | 6/1999 |
| EP | 0 942 013 | 9/1999 |
| EP | 1 295 910 | 3/2003 |
| EP | 1 302 310 | 4/2003 |
| EP | 1 367 068 | 12/2003 |
| EP | 1 408 077 | 4/2004 |
| EP | 1 429 346 | 6/2004 |
| EP | 1 484 345 | 12/2004 |
| EP | 1 495 861 | 1/2005 |
| EP | 1 634 699 | 3/2006 |
| EP | 1 724 289 | 11/2006 |
| EP | 1 726 602 | 11/2006 |
| EP | 1 726 603 | 11/2006 |
| EP | 1 847 551 | 10/2007 |

(Continued)

OTHER PUBLICATIONS

Chujo, R. Heptad configurational analysis of 13C N.M.R. spectra in highly isotactic polypropylene, *Polymer 29*, vol. 29, January, pp. 138-143 (1988).

(Continued)

*Primary Examiner* — Caixia Lu
(74) *Attorney, Agent, or Firm* — McAndrews, Held & Malloy, Ltd.

(57) ABSTRACT

A process for manufacturing a branched polypropylene, said branched polypropylene having a branching index g' of less than 1.00, the process comprising the step of polymerizing propylene and optionally one or more other comonomers under non-supercritical conditions in a reaction vessel, wherein:

c. the pressure during the polymerization of propylene and optionally one or more other comonomers in said reaction vessel is at least 45.4 bar;

d. the temperature during the polymerization of propylene and optionally one or more other comonomers in said reaction vessel is below 90° C.; and c. the polymerization of propylene and optionally one or more other comonomers is conducted in said reaction vessel in the presence of a catalyst system having a surface area of not more than 350 m²/g, measured according to ISO 9277, and said catalyst system comprises a metallocene catalyst having zirconium as the transition metal.

25 Claims, 5 Drawing Sheets

FOREIGN PATENT DOCUMENTS

| | | |
|---|---|---|
| EP | 1 847 552 | 10/2007 |
| EP | 1 847 555 | 10/2007 |
| JP | 2001/0168431 | 6/1999 |
| JP | 2001/354 814 | 7/2000 |
| JP | 2003 147110 | 11/2001 |
| JP | 2002 363356 | 12/2002 |
| JP | 2006/022 276 | 6/2004 |
| WO | WO 94/28034 | 12/1994 |
| WO | WO 95/30708 | 11/1995 |
| WO | WO 97/22633 | 6/1997 |
| WO | WO 92/12182 | 7/1997 |
| WO | WO 98/10016 | 3/1998 |
| WO | WO 98/58971 | 12/1998 |
| WO | WO 99/09096 | 2/1999 |
| WO | WO 99/24478 | 5/1999 |
| WO | WO 99/29742 | 6/1999 |
| WO | WO 00/012572 | 3/2000 |
| WO | WO 00/12572 | 3/2000 |
| WO | WO 00/68315 | 11/2000 |
| WO | WO 00/73369 | 12/2000 |
| WO | WO 00/78858 | 12/2000 |
| WO | WO 01/25296 | 4/2001 |
| WO | WO 01/48034 | 7/2001 |
| WO | WO 01/98409 | 12/2001 |
| WO | WO 02/16455 | 2/2002 |
| WO | WO 02/44251 | 6/2002 |
| WO | WO 02/090400 | 11/2002 |
| WO | WO03/000754 | 1/2003 |
| WO | WO 03/040233 | 5/2003 |
| WO | WO 03/051934 | 6/2003 |
| WO | WO 2004/013193 | 2/2004 |
| WO | WO2004/026921 | 4/2004 |
| WO | WO 2004/037871 | 5/2004 |
| WO | WO 2004/046208 | 6/2004 |
| WO | WO2004/052950 | 6/2004 |
| WO | WO 2005/044877 | 5/2005 |
| WO | WO 2006/118890 | 11/2006 |
| WO | WO 2008/022803 | 2/2008 |

OTHER PUBLICATIONS

Chujo R. Two-site model analysis of 13C n.m.r, of polypropylene polymerized by Ziegler-Natta catalyst with external alkoxysilane donors, *Polymer*, vol. 35, part II, pp. 339-342 (1994).

Sentmanat, Rheol, Measuring the Transient Extension Rheology of Polythylene Melts Using the SER Universal Testing Platform, J. Rheology, May/June Issue, pp. 1-20 (2005).

Zimm, B.H. and Stockmayer, Walter The Dimension of Chain Molecules Containing Branches and Rings, *The Journal of Chemical Physics*, vol. 17, No. 12, pp. 1301-1314 (1949).

Hayashi, et al., 13C N.M.R. spectral assignments and hexad comonomer sequence determination in stereoregular ethylene-propylene copolymer, *Polymer*, vol. 29, pp. 1848-1847 (1988).

Polypropylene Process Review, Does Borstar shine? *ECN Chemscope*, May 1999, pp. 17-18, 20-21.

Pinter, Gerald et al., *Accelerated quality assurance tests for PE pipe grades*, 64th Annual Technical Conference, pp. 2080-2084, Society of Plastics Engineers, (2006).

Cazenave, J., et al., Short-term mechanical and structural approaches for the evaluation of polyethylene stress crack resistance Groupe d'Etude de Metallurgie Physique et de Physique des Materiaux, *Polymer 47*, pp. 3904-3914 (2006).

Gahleitner, Markus et al., Propylene-ethylene random copolymers: comonomer effects on crystallinity and application properties, *Journal of Applied Polymer Science*, (2005), 95(5), 1073-1081; AAAAAAA.

Haager, Markus et al., *Estimation of slow crack growth behavior in polyethylene after stepwise isothermal crystallization*, Macromolecular Symposia (2004), 217 (Contributions from 6th Austrian Polymer Meeting, 2003), 383-390; AAAAAAA.

Nezbedova, E et al., Influence of processing conditions on the structural and fracture behavior of PP pipe grades, *Journal of Macromolecular Science*, Part B Physics, B41 Nos. 4-6, pp. 711-723, (2002).

Nezbedova, E. et al., Brittle failure versus structure of HDPE pipe resins, *Journal of Macromolecular Science*, Part B Physics, B40 3&4, pp. 507-515, (2001).

Nezbedova, E, et al., Relation of slow crack growth failure time to structure of HDPE, *Mechanics of Time-Dependent Materials 5*, pp. 67-78, (2001).

Nezbedova, E., et al., The Relationship Between Fracture Behavior and Structural Parameters of HDPE. *Plastics Pipeline Systems for the Millenium*, pp. 349-357 (1998).

Lodefier, Ph., et al., Chemical Heterogeneity of Poly(ethylene terephthalate) As Revealed by Temperature Rising Elution Fractionation and Its Influence on Polymer Thermal Behavior: A Comparison with Poly(ethylene terephthalate-co-isophthalate) *Macromolecules*, vol. 32 No. 21, pp. 7135-7139 (1999).

Hanyu, Aiko et al., Properties and film applications of metallocene-based isotactic polypropylenes, *Journal of Plastic Film & Sheeting*, vol. 15 No. 5, pp. 109-119, (1999).

Gueugnaut, D., et al., Detection of divergences in polyethylene resins fabrication by means of the modified stepwise isothermal segregation technique, *Journal of Applied Polymer Science*, vol. 73 No. 11, pp. 2103-2112, (1999).

Scholten F.L., et al. GERG materials bank of PE gas pipe grades. Recent developments, *Proceedings of the International Gas Research Conference*, vol. 3, pp. 257-268, (1998).

Hanyu, Aiko, et al. Properties and film applications of metallocene-based isotactic polypropylenes, 56th *Society of Plastics Engineers Annual Technical Conference*, vol. 2, pp. 1887-1891, (1998).

Ishikawa, Narumi, Study on the physical properties of polyethylene pipes for gas, *Nisseki Rebyu* Nippon Sekiyu, 32-(4), pp. 153-158, 1990.

Rätzsch, Radical reactions on polypropylene in the solid state, *Progress in Polymer Science*, Issue 27, pp. 1195-1282 (2002).

J. Dealy, "Structure and Rheology of Molten polymers", *Hanser Publishers Munich*, Germany, pp. 377-386, 2006.

Naguib E. Hani, Fundamental Foaming Mechanisms Governing the Volume Expansion of Extruded Polypropylene Foams, *Journal Applied. Poly. Science*, 91 pp. 2662-2668, (2008).

S. T. Lee, Foam Extrusion Principles and Practice, *Technomic Publishing*, pp. 1-15 (2000).

Virkkunen, Ville, et. al, Tacticity distribution of isotactic polypropylene prepared with heterogeneous Ziegler-Natta Catalyst. 2. Application and analysis of SSA data for polypropylene, *Polymer*, vol. 45, pp. 4623-4631, (2004).

Maria de Fátima Vieira Marques, et, al, Propylene Polymerization using combined Syndio- and isospecific metallocene catalysts supported on silica/MAO, *Journal of Applied Polymer Science*, vol. 99, pp. 628-637, (2006).

Spaleck, Walter, Synthesis and Properties of Metallocene Catalysts for Isotopic Polypropylene Production, *Metallocene-based Polyoefins*, pp. 400-424, (2000).

J Krupka, R G Geyer, J Baker-Jarvis and J Ceremuga, 'Measurements of the complex permittivity of microwave circuit board substrates using a split dielectric resonator and re-entrant cavity techniques', Proceedings of the Conference on Dielectric Materials, Measurements and Applications—DMMA '96, Bath, UK, published by the IEE, London, 1996.].

J Krupka, R N Clarke, O C Rochard and A P Gregory, 'Split-Post Dielectric Resonator technique for precise measurements of laminar dielectric specimens—measurement uncertainties', Proceedings of the XIII Int. Conference MIKON'2000, Wroclaw, Poland, pp. 305-308, 2000.

Ed. J. Sheirs, W. Kaminski, "Metallocenebased Polyolefines" vol. 1 (1999) 401-424.

The Dow Company, Commercial Product JQDB-2230NT of Dow, "Technical information for wire and cable" Telecom, pp. 1-2, Mar. 2005.

Product info sheet, Borealis Tech, "High-Melt Strength Polypropylene for Foam Excursion" pp. 1-4, edition 8 (2004).

* cited by examiner

Determination of the SHI of "A" at a strain rate of $0.1s^{-1}$ (SHI@$0.1s^{-1}$)

Deformation Rate versus Strain Hardening

Particle size distribution of the non-supported catalyst system via Coulter counter Particle size distribution of the supported catalyst system via Coulter counter

PROCESS FOR THE MANUFACTURE OF BRANCHED POLYPROPYLENE

RELATED APPLICATIONS

This application is a continuation of International Application Serial No. PCT/EP2007/064384 (International Publication Number WO 2008/080886 A1), having an International filing date of Dec. 20, 2007 entitled "Process for the Manufacture of Branched Polypropylene". International Application No. PCT/EP2007/064384 claimed priority benefits, in turn, from European Patent Application No. 06027007.1, filed Dec. 28, 2006. International Application No. PCT/EP2007/064384 and European Application No. 06027007.1 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present technology relates to a new process for the manufacture of branched polypropylene as well as to new branched polypropylenes obtained by said process.

BACKGROUND OF THE INVENTION

Different processes have been proposed for making polypropylene compositions. Such different processes typically have different variables and parameters, including different monomer(s), solvents, additives, reaction conditions, catalyst systems, and the like. The properties and characteristics of the final products are quite often dependent on the components used in the process and on the parameters of the process that are selected, and it has been recognized that small modifications in such variables and parameters can create significant differences in not only the final product, e.g. polymer properties, but also in the effectiveness of the overall process, e.g., catalyst productivity, presence or absence of gel and reproducibility of the process.

Various polypropylenes are known from linear to highly branched types. These polypropylenes have been developed to satisfy the increasing demands in end-product properties. Of course the different polypropylenes also result from specific tailored processes. For the manufacture of branched polypropylenes, especially long-chain branched polypropylenes, numerous processes have been described in the past. It is common general knowledge that metallocene catalysts are able to generate long-chain branched polypropylenes. It has been in particular noted, that elevated temperatures are conducive to vinyl-terminated chain ends enabling the production of long chain branched polymers via copolymerisation with propylene. Consequently the processes of the state of the art operate at rather high temperatures, i.e. at temperatures and pressures leading to a supercritical state in the reaction vessel. However such drastic conditions are on the one hand economically undesired as expensive and on the other hand such drastic conditions make it difficult to obtain products with high melting points, especially because the amount of misinsertions is relatively high.

WO 1999/029742 A1 is directed to a composition comprising essentially isotactic polypropylene. The process for the manufacture of said composition requires temperatures of more than 90° C.

WO 2000/012572 A1 describes a process for the manufacture of branched polypropylene in wide temperature range, i.e. from 40° C. to 120° C. Also with respect to the used pressure conditions during polymerisation the present technology remains vague. The patent does not provide any information how a long chain branched polypropylene can systematically and specifically obtained.

WO 2004/026921 A1 is concerned with a process for polymerisation of olefins at supercritical temperature conditions, in particular at temperatures over 140° C. The drawback of this method is the formation of high concentrations of misinsertions in the polypropylene leading to inferior products.

WO 2004/046208 A1 is directed to a method for the production of branched polypropylene using a metallocene catalyst. The reaction temperature is 100° C. and more.

WO 2004/052950 A1 discloses a bulk polymerisation process for polypropylene. The preferred temperatures are chosen in such a way that polymerisation process of polypropylene takes place under supercritical conditions. The obtained products suffer under the same drawbacks as outlined for WO 2004/026921 A1.

BRIEF SUMMARY OF THE INVENTION

The present technology provides an in-situ supercritical state in the growing polypropylene particle and/or on the surface of the growing polypropylene particle, such as by selecting process conditions in such a way that an overheating in the growing polypropylene particle and/or on the particle's surface occurs, generating supercritical conditions in said growing particle and/or on said particle's surface.

Certain embodiments of the present technology provide a process for manufacturing a branched polypropylene having a branching index g' of less than 1.00. The process comprises the steps of polymerizing propylene and optionally one or more other comonomers under non-supercritical conditions in a reaction vessel. The pressure during the polymerization of propylene and optionally one or more other comonomers in said reaction vessel is at least 45.4 bar. The temperature during the polymerization of propylene and optionally one or more other comonomers in said reaction vessel is below 90° C.

In certain embodiments, the polymerization of propylene and optionally one or more other comonomers is conducted in said reaction vessel in the presence of a catalyst system having a surface area of not more than 350 m$^2$/g, measured according to ISO 9277, and said catalyst system comprises a metallocene catalyst having zirconium as the transition metal.

In certain embodiments, the polymerization of propylene and optionally one or more other comonomers is conducted in said reaction vessel in the presence of a catalyst system having pore volume of below 3.50 cm$^3$/g, measured according to DIN 66135 (N$_2$), and said catalyst system comprises a metallocene catalyst having zirconium as the transition metal.

Certain embodiments of the present technology provide a branched polypropylene made by the processes described herein. Certain embodiments provide a branched polypropylene having a branching index, g', of less than 1.00 and a pore volume below 5.00 cm$^3$/g, measured according to DIN 66135 (N$_2$).

DETAILED DESCRIPTION OF THE INVENTION

Figure 1:
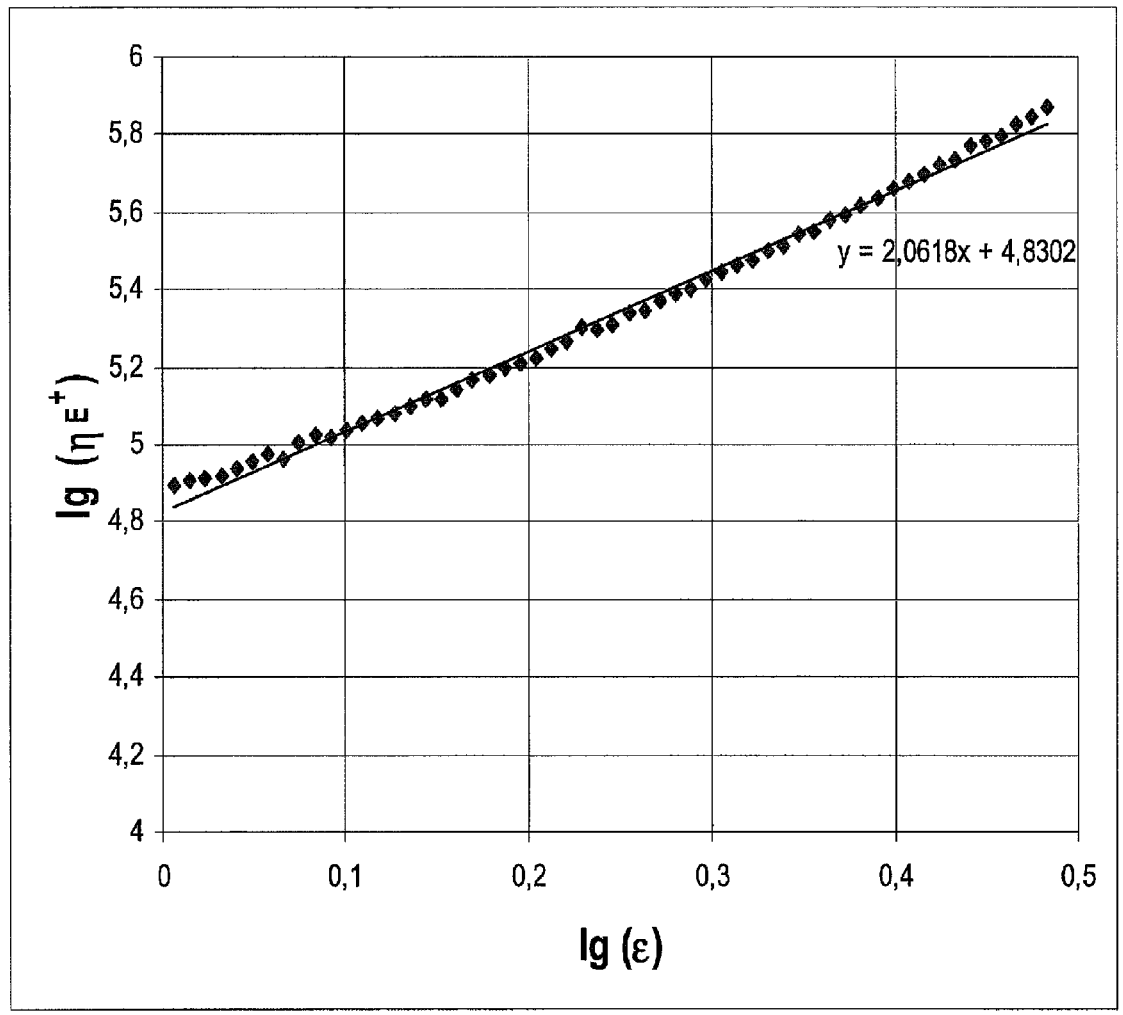
FIG. 1 is a graph depicting the determination of the SHI of "A" at a strain rate of 0.1 s$^{-1}$.

Accordingly the present technology provides a process for the manufacture of a branched polypropylene having a branching index g' of less than 1.00, wherein the process comprises the step of polymerizing propylene and optionally another (other) comonomer(s) under non-supercritical conditions in a reaction vessel, characterized in that
  a. the pressure during the polymerization of propylene and optionally another (other) comonomer(s) in said reaction vessel is at least 45.4 bar,
  b. the temperature during the polymerization of propylene and optionally another (other) comonomer(s) in said reaction vessel is below 90° C. and
  c. the polymerization of propylene and optionally another (other) comonomer(s) is conducted in said reaction vessel in the presence of a catalyst system having surface area of not more than 350 m²/g measured according to ISO 9277 and said catalyst system comprises a metallocene catalyst having zirconium as the transition metal.

Preferably, the process comprises a pre-polymerisation step, in which the catalyst system is pre-polymerised in the presence of propylene and optionally hydrogen under mild conditions, for example, at a pre-polymerisation reaction temperature between 25 and 70° C. and at a pre-polymerisation reaction pressure between 45.4 bar and 100 bar, more preferably between 45.4 bar and 75 bar. More preferably the residence time in the pre-polymerisation step is between 20 and 45 minutes and the pre-polymerisation degree is between 200 and 400 g polymer per g catalyst. The molecular weight of the pre-polymer should be between 50,000 and 150,000 g/mol.

Surprisingly, it has been found that a process with such parameters leads to a branched polypropylene, for example a long-chain branched polypropylene, even though in the reaction vessel no supercritical condition exits. However the conditions in the vessel are chosen in such a manner that presumably supercritical conditions in the growing polymer particle and/or on the surface of the growing polymer particle occur. Thus the process of the present technology—contrary to the state of the art—optimises the conditions for the growing polypropylene particle itself. The parameters are chosen in such a way that in particular a fragmentation of the catalyst system, for example a breaking of the catalyst system to smaller sizes, is diminished. In case a fragmentation of the catalyst system takes place new catalytic surfaces are generated causing a cooling effect of the surrounding, which in turn reduces the temperature increase in the particle. However a cooling in the growing polypropylene particle is detrimental when supercritical conditions in the particle and/or on the particle's surface itself shall be achieved. Thus the present technology provides a new approach to obtain branched polypropylenes, for example long-chain branched polypropylenes, in an efficient way. The new process is in particular featured by a rather low temperature in the reaction vessel as well as by a controlled fragmentation process of the catalyst system.

The first aspect of the present technology is that the process in the reaction vessel is carried out under non-supercritical conditions. The term "supercritical conditions" means according to the present technology that the vapour and liquid phases in the reaction vessel are indistinguishable. Thus at supercritical conditions the liquid state of the matter ceases to exist as a distinct phase. As a liquid is heated, its density decreases while the pressure and density of the vapour being formed increases. The liquid and vapour densities become closer and closer to each other until the critical temperature is reached where the two densities are equal and the liquid-gas line or phase boundary disappears. Additionally, as the equilibrium between liquid and gas approaches the critical point, heat of vaporization approaches zero, becoming zero at and beyond the critical point. More generally, the critical point is the point of termination of a phase equilibrium curve, which separates two distinct phases. At this point, the phases are no longer distinguishable. Accordingly the term "non-supercritical conditions" means that the vapour and liquid phases are distinguishable in the reaction vessel.

Another aspect is that the temperature in the reaction vessel during the polymerization of propylene and optionally another (other) comonomer(s) is below 90° C. However it is preferred that the temperature is below 80° C., even more preferred below 75° C. On the other hand the temperature should be not too low so that supercritical conditions in the growing polypropylene particle and/or on the surface of the growing polypropylene particle can provided. Thus it is preferred that the temperature in the reaction vessel is at least 65° C., more preferably at least 67° C. In a preferred embodiment the temperature in the reaction vessel is in the range of 65 to 85° C., even more preferred in the range of 65 to 78° C., still more preferred in a range of 68 to 73° C. In a particular preferred embodiment the temperature is around 70° C.

Furthermore the process according to the present technology requires a minimum of pressure in the reaction vessel to obtain branched polypropylene, for example long-chain branched polypropylene. Accordingly the pressure during the polymerization of the comonomer(s) in said reaction vessel is at least 45.4 bar, more preferably at least 46 bar, still more preferably at least 50 bar. On the other hand the pressure should be not too high as high pressure conditions are cost-intensive. Thus it is preferred that the pressure in the reaction vessel is not higher than 100 bar, more preferably not higher than 75 bar, still more preferably not higher than 70 bar. In a preferred embodiment the pressure in the reaction vessel is in the range of 45.4 to 75 bar, even more preferred in the range of 46 to 60 bar, still more preferred in a range of 51 to 55 bar. In a particular preferred embodiment the pressure is around 53 bar or 54 bar.

Finally the catalytic system fulfills specific aspects.

Firstly the catalytic system comprises a metallocene catalyst having zirconium as the transition metal. Thus a metallocene catalyst according to the present technology comprises zirconium as the transition metal and two cyclopentadienyl ligands, preferably substituted or unsubstituted indenyl ligands, bonding to said transition metal. The use of such a metallocene catalyst in the present polymerization process obtains a sufficient catalyst activity which cannot be achieved inter alia with conventional Ziegler-Natta complexes or other Titanium complexes. However in case the catalyst activity is too low no supercritical conditions in the growing polypropylene particle and/or on the surface of the growing particle are generated and thus no branched polypropylene is obtained.

Preferably the metallocene catalyst can be symmetric or asymmetric. However, it is preferred to use an asymmetric metallocene catalyst in the process of the present technology. "Symmetric" in the present technology means preferably that the metallocene catalyst comprises two cyclopentadienyl ligands of the same chemical formula. On the other hand in case the two cyclopentadienyl ligands of the metallocene catalyst have different chemical formulas then the metallocene catalyst is "asymmetric".

Secondly the surface area of the catalyst system must be rather low. The surface area is an indicator of the porosity of the catalyst system, in particular of supported metallocene catalysts. In case the catalyst system has rather large pores, and a rather large surface area, the system tends to break apart, which leads to a cooling effect. However any condition or event that affects negatively the supercritical state in the growing polypropylene particle and/or on the surface of the growing particle shall be avoided. Thus the surface area of the catalyst system is not more than 350 m$^2$/g. Preferably the catalyst system has a surface area below 300 m$^2$/g, more preferred below 150 m$^2$/g, still more preferred below 100 m$^2$/g, yet more preferred below 50 m$^2$/g, still yet more preferred below 20 m$^2$/g. In case the catalyst system is a supported catalyst system it is preferred that the surface area is in the range of 350 to 150 m$^2$/g, more preferably in the range of 350 to 250 m$^2$/g, still more preferred the surface area is around 320 m$^2$/g. In case the catalyst system comprises a non-silica supported metallocene as defined below in further detail the surface area is preferably below 20 m$^2$/g, still more preferably below 15 m$^2$/g, yet more preferably below 10 m$^2$/g and most preferably below 5 m$^2$/g. The surface area according to the present technology is measured according to ISO 9277 (N$_2$).

But not only the surface area of the catalyst system is an indicator for its porosity but also its pore volume. Thus it is preferred that the catalyst system has pore volume below 4.00 cm$^3$/g, more preferably below 3.50 cm$^3$/g, still more preferably below 3.00 cm$^3$/g, and yet more preferably below 2.00 cm$^3$/g. In a preferred embodiment the catalyst system, in particular the catalyst system comprising a non-silica supported metallocene as defined below in further detail, has a pore volume below 1.30 cm$^3$/g and more preferably below 1.00 cm$^3$/g. The pore volume has been measured according to DIN 66135 (N$_2$). In another preferred embodiment the pore volume is not detectable when determined with the method applied according to DIN 66135 (N$_2$).

The process can be further defined by the obtained branched polypropylene, for example by a branched polypropylene having a branching index g' of less than 1.00, more preferably less than 0.90, still more preferably less than 0.80. In another preferred embodiment, the branching index g' of the obtained branched polypropylene shall be less than 0.75. The branching index g' defines the degree of branching and correlates with the amount of branches of a polymer. The branching index g' is defined as g'=[IV]$_{br}$/[IV]$_{lin}$ in which g' is the branching index, [IV$_{br}$] is the intrinsic viscosity of the branched polypropylene and [IV]$_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference.

Moreover it is preferred that the branched polypropylene, for example the long-chain branched polypropylene, obtained by the process of the present technology is characterized by a rather low pore volume. Such a low pore volume is the result of the rather high temperatures in the growing propylene particle, and the supercritical state in the growing particle, even though the reaction temperature in the vessel is rather low. Accordingly it is preferred that the process leads to a branched polypropylene, in particular a long-chain branched polypropylene, as defined above and further defined below having in addition a pore volume, for example a powder pore volume, of below 5.00 cm$^3$/g, still more preferred below 3.50 cm$^3$/g and yet more preferred below 2.00 cm$^3$/g, measured according to DIN 66135 (N$_2$).

In a second aspect, the present technology is related to a process for the manufacture of a branched polypropylene having a branching index g' of less than 1.00, wherein the process comprises the step of polymerizing propylene and optionally another (other) comonomer(s) under non-supercritical conditions in a reaction vessel, characterized in that
  a. the pressure during the polymerization of propylene and optionally another (other) comonomer(s) in said reaction vessel is at least 45.4 bar,
  b. the temperature during the polymerization of propylene and optionally another (other) comonomer(s) in said reaction vessel is below 90° C. and
  c. the polymerization of propylene and optionally another (other) comonomer(s) is conducted in said reaction vessel in the presence of a catalyst system having a pore volume below 3.50 cm$^3$/g measured according to DIN 66135 (N$_2$) and said catalyst system comprises a metallocene catalyst having zirconium as the transition metal.

Preferably, the process comprises a pre-polymerisation step, in which the catalyst system is pre-polymerised in the presence of propylene and optionally hydrogen under mild conditions, for example at a pre-polymerisation reaction temperature between 25 and 70° C. and at a pre-polymerisation reaction pressure between 45.4 bar and 100 bar, more preferably between 45.4 bar and 75 bar. More preferably the residence time in the pre-polymerisation step is between 20 and 45 minutes and the pre-polymerisation degree is between 200 and 400 g polymer per g catalyst. The molecular weight of the pre-polymer should be between 50,000 and 150,000 g/mol.

Surprisingly, it has been found that a process with such parameters leads to a branched polypropylene, in particular long-chain branched polypropylene, even though in the reaction vessel no supercritical condition exits. However the conditions in the vessel are chosen in such a manner that presumably supercritical conditions in the growing polymer particle and/or on the surface of the growing polymer particle occur. Thus the process of the present technology—contrary to the state of the art—optimises the conditions for the growing polypropylene particle itself. The parameters are chosen in such a way that in particular a fragmentation of the catalyst system, for example a breaking of the catalyst system to smaller sizes, is diminished. In case a fragmentation of the catalyst system takes place new catalytic surfaces are generated causing a cooling effect of the surrounding, what in turn reduces the temperature increase in the particle. However a cooling in the growing polypropylene particle is detrimental when supercritical conditions in the particle and/or on the particle's surface itself shall be achieved. Thus the present technology provides a new approach to obtain branched polypropylenes, for example long-chain branched polypropylenes, in an efficient way. The new process is in particular featured by a rather low temperature in the reaction vessel as well as by a controlled fragmentation process of the catalyst system.

The first aspect of the present technology is that the process in the reaction vessel is carried out under non-supercritical conditions. The term "supercritical conditions" means according to the present technology that the vapour and liquid phases in the reaction vessel are indistinguishable. Thus at supercritical conditions the liquid state of the matter ceases to exist. As a liquid is heated, its density decreases while the pressure and density of the vapour being formed increases. The liquid and vapour densities become closer and closer to each other until the critical temperature is reached where the two densities are equal and the liquid-gas line or phase boundary disappears. Additionally, as the equilibrium between liquid and gas approaches the critical point, heat of vaporization approaches zero, becoming zero at and beyond the critical point. More generally, the critical point is the point of termination of a phase equilibrium curve, which separates two distinct phases. At this point, the phases are no longer distinguishable. Accordingly the term "non-supercritical conditions" means that the vapour and liquid phases are distinguishable in the reaction vessel.

Another aspect is that the temperature in the reaction vessel during the polymerization of propylene and optionally another (other) comonomer(s) is below 90° C. However it is preferred that the temperature is below 80° C., even more preferred below 75° C. On the other hand the temperature should be not too low so that supercritical conditions in the growing polypropylene particle and/or on the surface of the growing polypropylene particle can provided. Thus it is preferred that the temperature in the reaction vessel is at least 65° C., more preferably at least 67° C. In a preferred embodiment the temperature in the reaction vessel is in the range of 65 to 85° C., even more preferred in the range of 65 to 78° C., still more preferred in a range of 68 to 73° C. In a particular preferred embodiment the temperature is around 70° C.

Furthermore the process according to the present technology requires a minimum of pressure in the reaction vessel to obtain branched polypropylene, in particular long-chain branched polypropylene. Accordingly the pressure during the polymerization of the comonomer(s) in said reaction vessel is at least 45.4 bar, more preferably at least 46 bar, still more preferably at least 50 bar. On the other hand the pressure should be not too high as high pressure conditions are cost-intensive. Thus it is preferred that the pressure in the reaction vessel is not higher than 100 bar, more preferably not higher than 75 bar, still more preferably not higher than 70 bar. In a preferred embodiment the pressure in the reaction vessel is in the range of 45.4 to 75 bar, even more preferred in the range of 46 to 60 bar, still more preferred in a range of 51 to 55 bar. In a particular preferred embodiment the pressure is around 53 bar or 54 bar.

Finally the catalytic system must fulfil specific aspects.

Firstly the catalytic system must comprise a metallocene catalyst having zirconium as the transition metal. Thus a metallocene catalyst according to the present technology comprises zirconium as the transition metal and two cyclopentadienyl ligands, preferably substituted or unsubstituted indenyl ligands, bonding to said transition metal. The use of such a metallocene catalyst in the present polymerization process is necessary to obtain a sufficient catalyst activity which cannot be achieved inter alia with conventional Ziegler-Natta complexes or other Titan complexes. However in case the catalyst activity is to low no supercritical conditions in the growing polypropylene particle and/or on the surface of the growing particle are generated and thus no branched polypropylene, for example no long-chain branched polypropylene, is obtained.

Preferably the metallocene catalyst can be symmetric or asymmetric. However, it is preferred to use an asymmetric metallocene catalyst in the process of the present technology. "Symmetric" in the present technology means preferably that the metallocene catalyst comprises two cyclopentadienyl ligands of the same chemical formula. On the other hand in case the two cyclopentadienyl ligands of the metallocene catalyst have different chemical formulas then the metallocene catalyst is "asymmetric".

Secondly the pore volume of the catalyst system must be rather low. The pore volume is an indicator of the porosity of the catalyst system, in particular of supported metallocene catalysts. In case the catalyst system has rather large pores, and a rather large pore volume, the system tends to break apart, which leads to a cooling effect. However any condition or event that effects negatively the supercritical state in the growing polypropylene particle and/or on the surface of the growing polypropylene particle shall be avoided. Thus the catalyst system has a pore volume below 3.50 $cm^3/g$, more preferably below 3.00 $cm^3/g$ and still more preferably below 2.00 $cm^3/g$. In a preferred embodiment the catalyst system, in particular the catalytic system comprising a non-silica supported metallocene as defined below in further detail, has a pore volume below 1.30 $cm^3/g$ and more preferably below 1.00 $cm^3/g$. The pore volume has been measured according to DIN 66135 ($N_2$). In another preferred embodiment the pore volume is not detectable when determined with the method applied according to DIN 66135 ($N_2$).

But not only the pore volume of the catalyst system is an indicator for its porosity but also its surface area. Thus the surface area of the catalyst system is not more than 350 $m^2/g$. Preferably the catalyst system has a surface area below 300 $m^2/g$, more preferred below 150 $m^2/g$, still more preferred below 100 $m^2/g$, yet more preferred below 50 $m^2/g$, still yet more preferred below 20 $m^2/g$. In case the catalyst system is a supported catalyst system it is preferred that the surface area is in the range of 350 to 150 $m^2/g$, more preferably in the range of 350 to 250 $m^2/g$, still more preferred the surface area is around 320 $m^2/g$. In turn the catalyst system comprises a non-silica supported metallocene as defined below in further detail the surface area is preferably below 20 $m^2/g$, still more preferably below 15 $m^2/g$, yet more preferably below 10 $m^2/g$ and most preferably below 5 $m^2/g$. The surface area according to the present technology is measured according to ISO 9277 ($N_2$).

The process is further defined by the obtained branched polypropylene, for example by a branched polypropylene having a branching index g' of less than 1.00, more preferably less than 0.90, still more preferably less than 0.80. In the preferred embodiment, the branching index g' of the obtained branched polypropylene shall be less than 0.75. The branching index g' defines the degree of branching and correlates with the amount of branches of a polymer. The branching index g' is defined as g'=$[IV]_{br}/[IV]_{lin}$ which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases.

Reference is made in this context to B. H. Zimm and W. H. Stockmeyer, J. Chem. Phys. 17, 1301 (1949). This document is herewith included by reference.

Moreover it is preferred that the branched polypropylene, for example the long-chain branched polypropylene, obtained by the process of the present technology is characterized by a rather low pore volume. Such a low pore volume is the result of the rather high temperatures in the growing propylene particle, for example the supercritical state in the growing particle, even though the reaction temperature in the vessel is rather low. Accordingly it is preferred that the process leads to a branched polypropylene, in particular a long-chain branched polypropylene, as defined above and further defined below having in addition a pore volume, for example a powder pore volume, of below 5.00 cm$^3$/g, still more preferred below 3.50 cm$^3$/g and yet more preferred below 2.00 cm$^3$/g, measured according to DIN 66135 (N$_2$).

Thus, considering the problems outlined above, it is an object of the present technology to provide a process for the manufacture of branched polypropylene under mild conditions and reproducible results, avoiding the drawbacks of the processes of the state of the art in particular of the processes using supercritical conditions in the reaction vessel.

The further features mentioned below apply to all embodiments described above, including the first and the second aspects of the present technology.

As stated above the process of the present technology leads to a branched polypropylene, for example a long-chain branched polypropylene. Accordingly one compound which has to be fed into the reaction vessel is propylene. However in case a branched propylene copolymer shall be obtained also another (other) comonomer(s) is (are) additionally fed in the reactor. Any comonomer is suitable however the use of α-olefine(s) is preferred. In particular ethylene and/or a C$_4$ to C$_8$ α-olefin, such as 1-butene, can be charged together with propylene in the reaction vessel. In a particular preferred process for the manufacture of branched propylene copolymer, such as defined in further detail below, propylene and ethylene are fed, preferably in separate fed lines, into the reaction vessel as reactive compounds.

In case the process as defined in the present technology shall lead to a branched propylene homopolymer, in particular to a branched homopolymer as defined in further detail below, only propylene is charged in the reaction vessel as reactive compound.

A high catalyst activity of the catalyst system contributes to a supercritical state in the growing polypropylene particle as a high activity also raises the temperature in the particle. Thus is preferred that the catalyst system has a catalyst activity of at least 10 kg PP/g cat×h, still more preferably of at least more than 15 kg PP/g cat×h, and yet more preferred of more than 22 kg PP/g cat×h. In a preferred embodiment the catalyst activity is more than 30 kg PP/g cat×h.

Preferably the catalyst system of the present technology has particle size of not more than 100 μm. In case the catalyst system comprises a silica supported catalyst the average particle size is preferably in the range of 10 to 100 μm, more preferably in the range of 20 to 80 μm. In turn the average particle size is preferably in the range of 1 to 500 μm, more preferably in the range of 5 to 200 μm, yet more preferably 10 to 50 μm in case the catalyst system comprises a non-supported catalyst, for example a non-silica supported catalyst.

Preferably the high catalyst activity is obtained with a metallocene catalyst as defined as follows: A metallocene catalyst with a rather high activity has the formula (I):

$$(Cp)_2R_zZrX_2 \quad \quad (I)$$

wherein
z is 0 or 1,

X is independently a monovalent anionic ligand, such as σ-ligand

R is a bridging group linking the two Cp-ligands the two Cp-ligands are selected independently from each other from the group consisting of unsubstituted cyclopentadienyl ring, unsubstituted indenyl ring, unsubstituted tetrahydroindenyl ring, unsubstituted fluorenyl ring, substituted cyclopentadienyl ring, substituted indenyl ring, substituted tetrahydroindenyl ring, and substituted fluorenyl ring.

In one specific embodiment the metallocene catalyst as defined above and further defined below is an asymmetric metallocene catalyst, for example a metallocene catalyst characterized in that both Cp-ligands are selected from the above stated group and both Cp-ligands have a different chemical structure.

In another specific embodiment the metallocene catalyst as defined above and further defined below is a symmetric metallocene catalyst, or a metallocene catalyst characterized in that both Cp-ligands are selected from the above stated group and both Cp-ligands are chemically the same, or are identical.

The term "σ-ligand" is understood in the whole description in a known manner, as a group bonded to zirconium (Zr) at one or more places via a sigma bond. A preferred monovalent anionic ligand is halogen, in particular chlorine (Cl).

Preferably, the metallocene catalyst is of formula (I) indicated above wherein each X is Cl.

Preferably both Cp-ligands are substituted.

Preferably, both Cp-ligands are selected independently from the group consisting of substituted cyclopentadienyl-ring, substituted indenyl-ring, substituted tetrahydroindenyl-ring, and substituted fluorenyl-ring wherein the Cp-ligands differ in the substituents bonded to the rings in case the metallocene catalyst shall be asymmetric or the Cp-ligands are chemically the same, or are chemically identical, in case the metallocene catalyst shall be symmetric.

The optional one or more substituent(s) bonded to cyclopentadienyl, indenyl, tetrahydroindenyl, or fluorenyl may be independently selected from the group including halogen, hydrocarbyl (e.g. C$_1$-C$_{20}$-alkyl, C$_2$-C$_{20}$-alkenyl, C$_2$-C$_{20}$-alkynyl, C$_3$-C$_{12}$-cycloalkyl, C$_6$-C$_{20}$-aryl or C$_7$-C$_{20}$-arylalkyl), C$_3$-C$_{12}$-cycloalkyl which contains 1, 2, 3 or 4 heteroatom(s) in the ring moiety, C$_6$-C$_{20}$-heteroaryl, C$_1$-C$_{20}$-haloalkyl, —SiR"$_3$, —OSiR"$_3$, —SR", —PR"$_2$ and —NR"$_2$, wherein each R" is independently a hydrogen or hydrocarbyl, e.g. C$_1$-C$_{20}$-alkyl, C$_2$-C$_{20}$-alkenyl, C$_2$-C$_{20}$-alkynyl, C$_3$-C$_{12}$-cycloalkyl or C$_6$-C$_{20}$-aryl.

More preferably both Cp-ligands are indenyl moieties wherein each indenyl moiety bear one or two substituents as defined above.

In the case of the asymmetric metallocene catalyst each Cp-ligand is preferably an indenyl moiety bearing two substituents as defined above, with the proviso that the substituents are chosen in such a manner that both Cp-ligands are of different chemical structure, or both Cp-ligands differ at least in one substituent bonded to the indenyl moiety, in particular differ in the substituent bonded to the five member ring of the indenyl moiety.

In the case of the symmetric metallocene catalyst both identical Cp-ligands are indenyl moieties wherein each indenyl moiety bears one or two substituents as defined above. More preferably each of the identical Cp-ligands is an indenyl moiety bearing two substituents as defined above, with the proviso that the substituents are chosen in such a manner that both Cp-ligands are of the same chemical structure, or both Cp-ligands have the same substituents bonded to chemically the same indenyl moiety.

Still more preferably both Cp-ligands are indenyl moieties wherein the indenyl moieties comprise at least at the five member ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl. In case of the asymmetric metallocene catalyst the indenyl moieties of both Cp-ligands must chemically differ from each other, or the indenyl moieties of both Cp-ligands comprise different substituents as defined in this paragraph. On the other hand in case the metallocene catalyst shall be symmetric the indenyl moieties of both Cp-ligands are of the same chemical structure, or both Cp-ligands have the same substituents as defined in this paragraph bonded to chemically the same indenyl moiety.

Still more preferred both Cp-ligands are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety. In case of the asymmetric metallocene catalyst the indenyl moieties of both Cp-ligands must chemically differ from each other, or the indenyl moieties of both Cp-ligands comprise different substituents as defined in this paragraph. On the other hand in case the metallocene catalyst shall be symmetric the indenyl moieties of both Cp-ligands are of the same chemical structure, or both Cp-ligands have the same substituents as defined in this paragraph bonded to chemically the same indenyl moiety.

Yet more preferably both Cp-ligands are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety. In case of the asymmetric metallocene catalyst the indenyl moieties of both Cp-ligands must chemically differ from each other, or the indenyl moieties of both Cp-ligands comprise different substituents as defined in this paragraph. It is in particular preferred that both Cp-ligands are idenyl rings comprising two substituentes each and differ in the substituents bonded to the five membered ring of the idenyl rings. On the other hand in case the metallocene catalyst shall be symmetric the indenyl moieties of both Cp-ligands are of the same chemical structure, or both Cp-ligands have the same substituents as defined in this paragraph bonded to chemically the same indenyl moiety.

Concerning the moiety "R" it is preferred that "R" has the formula (II)

$$—Y(R')_2— \quad (II)$$

wherein
Y is C, Si or Ge, and
R' is $C_1$ to $C_{20}$ alkyl, $C_6$-$C_{12}$ aryl, or $C_7$-$C_{12}$ arylalkyl or trimethylsilyl.

In case both Cp-ligands of the metallocene catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. trimethylsilyl, $C_1$-$C_{20}$ alkyl, $C_1$-$C_{10}$ alkyl, such as $C_6$-$C_{12}$ aryl, or $C_7$-$C_{40}$ arylalkyl, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the metallocene catalyst is defined by the formula (III)

$$(Cp)_2R_1ZrCl_2 \quad (III)$$

wherein
both Cp-ligands coordinate to zirconium (Zr) and are selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, R is a bridging group linking two ligands L, wherein R is defined by the formula (II)

$$—Y(R')_2— \quad (II)$$

wherein
Y is C, Si or Ge, and
R' is $C_1$ to $C_{20}$ alkyl, $C_6$-$C_{12}$ aryl, or $C_7$-$C_{12}$ arylalkyl.

More preferably the metallocene catalyst is defined by the formula (III), wherein both Cp-ligands are selected from the group consisting of substituted cyclopentadienyl, substituted indenyl, substituted tetrahydroindenyl, and substituted fluorenyl.

In case the metallocene catalyst is asymmetric it is yet more preferred that the metallocene catalyst is defined by the formula (III), wherein both Cp-ligands are selected from the group consisting of substituted cyclopentadienyl, substituted indenyl, substituted tetrahydroindenyl, and substituted fluorenyl with the proviso that both Cp-ligands differ in the substituents, or the substituent's as defined above, bonded to cyclopentadienyl, indenyl, tetrahydroindenyl, or fluorenyl.

Still more preferably the metallocene catalyst being asymmetric is defined by the formula (III), wherein both Cp-ligands are indenyl and both indenyl differ in one substituent, or in a substituent as defined above bonded to the five member ring of indenyl.

In case the metallocene catalyst is symmetric it is yet more preferred that the metallocene catalyst is defined by the formula (III), wherein both Cp-ligands are identical and are selected from the group consisting of substituted cyclopentadienyl, substituted indenyl, substituted tetrahydroindenyl, and substituted fluorenyl.

The asymmetric variants as defined above are preferred.

It is in particular preferred that the metallocene catalyst as defined above is non-silica supported.

In case the above metallocene catalyst as defined above is supported, a porous particulate material, such as for example, talc, inorganic oxides, inorganic chlorides and resinous materials such as polyolefin or polymeric compounds is used.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesium, titanium, zirconium, and the like. Preferably the support material is porous silica which has a surface area below 350.00 m²/g and/or a pore volume below 4.00 cm³/g, or below 3.50 cm³/g. It may be particularly desirable to dehydrate the silica at a temperature of from about 100° C. to about 800° C. anywhere from about 3 to about 24 hours. In case the catalyst system is a supported metallocene catalyst, the metallocene catalyst, the atactivator and the support material may be combined in any number of ways. Suitable support techniques are described in U.S. Pat. Nos. 4,808,561 and 4,701,432. Also a good overview is provided in: Metallocene-based Polyolefins Ed. J. Scheirs, W. Kaminski Vol. 1 (1999) 401-424 and references cited therein In one preferred embodiment the metallocene catalyst is dimethylsilyl[(2-methyl-(4'-tert.butyl)-4-phenyl-indenyl)(2-isopropyl-(4'-tert.butyl)-4-phenyl-indenyl)]zirkonium dichloride [IUPAC: dimethylsilandiyl[2-methyl-(4'-tert.butyl)-4-phenyl-indenyl)(2-isopropyl-(4'-tert.butyl)-4-phenyl-indenyl)]zirkonium dichloride]. More preferred said metallocene catalyst is not silica supported.

In another preferred embodiment the metallocene catalyst is dimethylsilyl(2-methyl-4-phenyl-indenyl)$_2$zirkonium dichloride [IUPAC: dimethylsilandiylbis(2-methyl-4-phenyl-indenyl)zirkonium dichloride]. More preferred said metallocene catalyst is not silica supported.

The above described metallocene catalysts, in particular the not silica supported metallocene catalysts, are prepared according to the methods described in WO 01/48034.

It is in particular preferred that the metallocene catalyst system is obtained by the emulsion solidification technology as described in WO 03/051934. This document is herewith included in its entirety by reference. Hence the metallocene catalyst is preferably in the form of solid catalyst particles, obtainable by a process comprising the steps of a) preparing a solution of one or more metallocene catalyst components;

b) dispersing said solution in a solvent immiscible therewith to form an emulsion in which said one or more catalyst components are present in the droplets of the dispersed phase, c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 1.00 to 500.00 μm, more preferably 5.00 to 200.00 μm, yet more preferably of 10.00 to 50.00 μm.

Moreover, the form of solidified particles have preferably a spherical shape, a predetermined particles size distribution and a surface area as mentioned above of preferably less than 25 m²/g, still more preferably less than 20 m²/g, yet more preferably less than 15 m²/g, yet still more preferably less than 10 m²/g and most preferably less than 5 m²/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is enclosed herein with reference.

Preferred as cocatalysts if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described inter alia in WO 94/28034 which is incorporated herein by reference. These are linear or cyclic oligomers of having up to 40, preferably 3 to 20, —(Al(R''')O)— repeating units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:Zr in the range of 1 to 10

000, suitably 5 to 8000, preferably 10 to 7000, e.g. 100 to 4000, such as 1000 to 3000. Typically in case of solid (heterogeneous) supported catalyst the ratio is preferably below 500. In the case of the non-supported catalyst the Al:Zr molar ratio is typically 1 to 500, preferably 10 to 300, e.g. 100 to 300.

The quantity of cocatalyst to be employed in the catalyst of the present technology is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Preferably the process as defined above is a slurry polymerization, even more preferred a bulk polymerization.

As used herein, the term "slurry polymerization" means a polymerization process that involves at least two phases, e.g. in which particulate, solid polymer (e.g. granular) is formed in a liquid or polymerization medium, or in a liquid/vapour polymerization medium. Certain embodiments of the processes described herein are slurry polymerizations, e.g. processes in which the products of polymerization are solid. The polymerization products (e.g. polypropylenes) in those processes preferably have melting points sufficiently high to avoid melting during polymerization, so that they can in many cases be recovered as granular polymer. A slurry polymerization may include solvent (which is also referred to as diluent), or it may be a bulk process, discussed below.

As used herein, the term "bulk process" means a polymerization process in which the polymerization medium consists entirely of or consists essentially of monomers and any products of polymerization that has taken place, e.g. macromers and polymers, but does not include solvent (which also means that no diluent is present), or includes minor amounts of solvent, defined as less than 50 volume percent, and preferably much less.

Still more preferably the process is used in industrial scale, for example the amount of product per hour is more than 50 kg/h. Thus the present process is preferably not used for laboratory scales.

Preferably, the process is a multi-stage process to obtain multimodal polypropylene as defined in further detail below.

Multistage processes are defined, in addition to the process as described above, in particular by a slurry reactor, still more preferred a bulk reactor, and a gas phase reactor, for producing multimodal polypropylene, for example long-chain branched polypropylene.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polypropylenes can be produced according to several processes which are described, e.g. in WO 92/12182, EP 0 887 379 and WO 97/22633.

A multimodal branched polypropylene, for example a long-chain branched polypropylene, according to the present technology is produced preferably in a multi-stage process in a multi-stage reaction sequence as described in WO 92/12182. The contents of this document are included herein by reference.

It has previously been known to produce multimodal, in particular bimodal, polypropylene in two or more reactors connected in series, such as in different steps (a) and (b).

According to the present technology, the main polymerization stages are preferably carried out as a combination of a bulk polymerization and gas phase polymerization, wherein the bulk polymerization is carried out as defined above, for example in the temperature and pressure ranges as given above as well as with the catalyst system as defined above.

The bulk polymerizations are preferably performed in a so-called loop reactor.

In order to produce the multimodal branched polypropylene, for example the long-chain branched polypropylene, according to the present technology, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a), the bulk polymerization.

The pre-polymerisation step has preferably a reaction temperature between 25 and 70° C. and a reaction pressure between 45.4 bar and 100 bar, more preferably between 45.4 bar and 75 bar. More preferably the residence time in the pre-polymerisation step is between 20 and 45 minutes and the pre-polymerisation degree is between 200 and 400 g polymer per g catalyst. The molecular weight of the pre-polymer should be between 50,000 and 150,000 g/mol.

If desired, a further elastomeric comonomer component, so called ethylene-propylene rubber (EPR) component as defined in the present technology, may be incorporated into the obtained propylene polymer to form a propylene copolymer as defined below. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the branched polypropylene, for example the long-chain branched polypropylene, as defined above the conditions for the bulk reactor of step (a) may be as follows:

the temperature is within the range of 65° C. to 78° C., preferably between 68° C. and 73° C., most preferably around 70° C.

the pressure is within the range of 45.4 bar to below 60 bar, preferably between 51 bar to 55 bar, more preferably around 53 bar or 54 bar, with the proviso that no supercritical condition in the bulk reactor exists the catalyst system comprising
a) a supported metaollocene catalyst has pore volume below 3.50 cm³/g, more preferably below 2.50 cm³/g and/or has a surface area in the range of 350 to 250 m²/g, or
b) a non-silica supported, more preferably non-supported, metaollocene catalyst has pore volume below 2.50 cm³/g still more preferably below 1.30 cm³/g, yet more preferably below 1.00 cm³/g, yet still more preferably the pore volume is not detectable when determined with the method applied according to DIN 66135 (N₂) and/or has a surface area than 100 m²/g, more preferably of less than 50 m²/g, still more preferably of less than 20 m²/g, yet more preferably less than 10 m²/g, yet still more preferably of less than 10 m²/g and most preferred of less than 5 m²/g when measured according to ISO 9277 (N₂)

the metallocene catalyst of the catalyst system is preferably defined by the formula (III)

$$(Cp)_2R_1ZrCl_2 \quad\quad (III)$$

wherein
both Cp-ligands coordinate to zirconium (Zr) and are selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, R is a bridging group linking two ligands L,
wherein R is defined by the formula (II)

wherein
Y is C, Si or Ge, and
R' is $C_1$ to $C_{20}$ alkyl, $C_6$-$C_{12}$ aryl, or $C_7$-$C_{12}$ arylalkyl, more preferably the metallocene catalyst is dimethylsilyl[(2-methyl-(4'-tert.butyl)-4-phenyl-indenyl)(2-isopropyl-(4'-tert.butyl)-4-phenyl-indenyl)]zirkonium dichloride [IUPAC: dimethylsilandiyl[2-methyl-(4'-tert.butyl)-4-phenyl-indenyl)(2-isopropyl-(4'-tert.butyl)-4-phenyl-indenyl)]zirkonium dichloride] or dimethylsilyl(2-methyl-4-phenyl-indenyl)$_2$zirkonium dichloride [IUPAC: dimethylsilandiylbis(2-methyl-4-phenyl-indenyl) zirkonium dichloride], yet more preferred said metallocene catalyst is non-silica supported.

hydrogen can be added for controlling the molar mass in a manner known per se.

Before step (a), preferably a pre-polymerization takes place as defined above, for example the reaction temperature is between 25 and 70° C. and the reaction pressure is between 45.4 bar and 100 bar, more preferably between 45.4 bar and 75 bar, among other conditions. More preferably the residence time in the pre-polymerization step is between 20 and 45 minutes and the pre-polymerization degree is between 200 and 400 g polymer per g catalyst. The molecular weight of the pre-polymer should be between 50,000 and 150,000 g/mol. Subsequently, the reaction mixture from the bulk reactor (step a) is, if desired, transferred to the gas phase reactor, or to step (b), whereby the conditions in step (b) are preferably as follows:

the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in both reactor zones. In one embodiment of the process for producing the polypropylene polymer the residence time in bulk reactor, e.g. loop is in the range 0.5 to 5 hours, e.g. 0.5 to 2 hours and the residence time in gas phase reactor will generally be 1 to 8 hours.

The process of the present technology or any embodiments thereof above enable highly feasible means for producing and further tailoring the branched polypropylene, for example the long-chain branched polypropylene, within the present technology, e.g. the properties of the polymer composition can be adjusted or controlled in a known manner e.g. with one or more of the following process parameters: temperature, hydrogen feed, comonomer feed, propylene feed e.g. in the bulk phase reactor and optionally in the gas phase reactor, catalyst, split between components.

Preferably the process for the manufacture of branched polypropylene, for example the long-chain branched polypropylene, does not comprise a cross-linking step as it is commonly done to improve the process properties of the polypropylene.

As stated above, the parameters of the process for the manufacture of the branched polypropylene, for example the long-chain branched polypropylene, as defined herein must be chosen in such a way, that a) in the reaction vessel no supercritical conditions occur and
b) a fragmentation of the catalyst system is diminished and preferably controlled by pre-polymerisation to provide supercritical conditions in the growing polypropylene particle in the loop reactor.

Thus the temperature and pressure as well as the catalyst system must be adopted on each other to achieve the above stated aspects. For example in case a catalyst is taken with a high activity for the process of the present technology the pressure in the reaction vessel can be lowered compared to a process in which a catalyst with lower activity is employed. However in any case the aspects as defined above must be considered and the parameters chosen must be within in the limits as provided in the present technology. The following preferred embodiments are described for the process of the present technology:

In a first specific embodiment the catalyst system used in the process of the present technology comprises dimethylsilyl [(2-methyl-(4'-tert.butyl)-4-phenyl-indenyl)(2-isopropyl-(4'-tert.butyl)-4-phenyl-indenyl)]zirkonium dichloride [IUPAC: dimethylsilandiyl[2-methyl-(4'-tert.butyl)-4-phenyl-indenyl)(2-isopropyl-(4'-tert.butyl)-4-phenyl-indenyl)] zirkonium dichloride] as a metallocene catalyst. Said catalyst is silica supported. The catalyst system has surface area in the range of 250 to 350 $m^2$/g and a pore volume in the range of 1.50 to 3.00 $cm^3$/g. The catalyst activity is in the range of 10.00 to 30.00 kg PP/g cat×h. The temperature in the reaction vessel is about 70° C. and the pressure in the reaction vessel is in the range of 52 to 55 bar.

In a second specific embodiment the catalyst system used in the process of the present technology comprises dimethylsilyl[(2-methyl-(4'-tert.butyl)-4-phenyl-indenyl)(2-isopropyl-(4'-tert.butyl)-4-phenyl-indenyl)]zirkonium dichloride [IUPAC: dimethylsilandiyl[2-methyl-(4'-tert.butyl)-4-phenyl-indenyl)(2-isopropyl-(4'-tert.butyl)-4-phenyl-indenyl)] zirkonium dichloride] as a metallocene catalyst. Said catalyst is not silica supported. The catalyst system has surface area below 5.00 $m^2$/g and a pore volume below 1.00 $cm^3$/g. The catalyst activity is in the range of 10.00 to 30.00 kg PP/g cat×h. The temperature in the reaction vessel is about 70° C. and the pressure in the reaction vessel is in the range of 52 to 55 bar.

In a third specific embodiment the catalyst system used in the process of the present technology comprises dimethylsilyl (2-methyl-4-phenyl-indenyl)$_2$zirkonium dichloride [IUPAC: dimethylsilandiylbis(2-methyl-4-phenyl-indenyl) zirkonium dichloride] as a metallocene catalyst. Said catalyst is not silica supported. The catalyst system has surface area below 5.00 $m^2$/g and a pore volume below 1.00 $cm^3$/g. The catalyst activity is in the range of 10.00 to 30.00 kg PP/g cat×h. The temperature in the reaction vessel is about 70° C. and the pressure in the reaction vessel is in the range of 52 to 55 bar.

The above process enables very feasible means for obtaining the reactor-made branched polypropylene, for example the reactor made long-chain branched polypropylene, having a branching index g' of less than 1.00 as defined in further detail below.

A remarkable property of the branched polypropylene polymer particles, for example the branched polypropylene polymer powder particles, obtained by the process of the present technology is its low pore volume, in particular its low pore volume after the polymerisation in the bulk reactor. Hence it is preferred that the branched polypropylene reactor product, for example the long-chain branched polypropylene reactor product, has a pore volume, in particular after the polymerization in the bulk reactor, below 5.00 $cm^3$/g, more preferably below 3.50 cm³/g, yet more preferably below 2.00 cm³/g, measured according to DIN 66135 (N₂).

A further preferred aspect is that the strain hardening index (SHI@1 s⁻¹) of the branched polypropylene, for example the long-chain branched polypropylene, obtained by the process of the present technology shall be at least 0.15, more preferred of at least 0.30, still more preferred of at least 0.40 and yet more preferred of at least 0.50.

The strain hardening index (SHI) is a measure for the strain hardening behavior of the polymer melt, in particular of the polypropylene melt. In the present technology, the strain hardening index (SHI@1 s⁻¹) has been measured by a deformation rate (dε/dt) of 1.00 s⁻¹ at a temperature of 180° C. for determining the strain hardening behaviour, wherein the strain hardening index (SHI) is defined as the slope of the tensile stress growth function $\eta_E^+$ as a function of the Hencky strain ε on a logarithmic scale between 1.00 and 3.00 (see FIG. 1). Thereby the Hencky strain ε is defined by the formula $\varepsilon = \dot{\varepsilon}_H t$, wherein
the Hencky strain rate $\dot{\varepsilon}_H$ is defined by the formula $$\dot{\varepsilon}_H = \frac{2 \cdot \Omega \cdot R}{L_0} [s^{-1}]$$

with
"$L_0$" is the fixed, unsupported length of the specimen sample being stretched which is equal to the centerline distance between the master and slave drums,
"R" is the radius of the equi-dimensional windup drums, and
"Ω" is a constant drive shaft rotation rate.
In turn the tensile stress growth function $\eta_E^+$ is defined by the formula $$\eta_E^+(\varepsilon) = \frac{F(\varepsilon)}{\dot{\varepsilon}_H \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_S}{d_M}\right)^{2/3} \cdot \exp(-\varepsilon) \text{ wherein}$$

the Hencky strain rate $\dot{\varepsilon}_H$ is defined as for the Hencky strain ε
"F" is the tangential stretching force
"R" is the radius of the equi-dimensional windup drums
"T" is the measured torque signal, related to the tangential stretching force "F"
"A" is the instantaneous cross-sectional area of a stretched molten specimen
"$A_0$" is the cross-sectional area of the specimen in the solid state (prior to melting),
"$d_s$" is the solid state density and
"$d_M$" is the melt density of the polymer.

The branched polypropylene, for example the long-chain branched polypropylene, obtained by the process of the present technology may be further characterized by the strain rate thickening which means that the strain hardening increases with extension rates. A strain hardening index (SHI) can be determined at different strain rates. A strain hardening index (SHI) is defined as the slope of the tensile stress growth function $\eta_E^+$ as function of the Hencky strain ε on a logarithmic scale between 1.00 and 3.00 at a at a temperature of 180° C., where a SHI@0.1 s⁻¹ is determined with a deformation rate $\dot{\varepsilon}_H$ of 0.10 s⁻¹, a SHI@0.3 s⁻¹ is determined with a deformation rate $\dot{\varepsilon}_H$ of 0.30 s⁻¹, a SHI@3 s⁻¹ is determined with a deformation rate $\dot{\varepsilon}_H$ of 3.00 s⁻¹, a SHI@10 s⁻¹ is determined with a deformation rate $\dot{\varepsilon}_H$ of 10.0 s⁻¹.

Hence, the branched polypropylene, for example the long-chain branched polypropylene, obtained by the process of the present technology is characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk theological measurement which apply shear flow.

Accordingly, the branched polypropylene, for example the long-chain branched polypropylene, obtained by the process of the present technology is preferably characterized by the fact that their strain hardening index (SHI) increases with the deformation rate $\dot{\varepsilon}_H$, a phenomenon which is not observed in other polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear or short-chain branched polymers do not show such a relationship, or the strain hardening index (SHI) is not influenced by the deformation rate (see FIGS. 2 and 3).

Accordingly, the strain hardening index (SHI) of known polymers, in particular known polypropylenes and polyethylenes, does not increase or increases only negligible with increase of the deformation rate (dε/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process the melt of the branched polypropylenes, for example the long-chain branched polypropylenes, has a high stability.

For further information concerning the measuring methods applied to obtain the relevant data for the tensile stress growth function $\eta_E^+$, the Hencky strain rate $\dot{\varepsilon}_H$, the Hencky strain ε and the branching index g' it is referred to the example section.

Moreover it is preferred that the branched polypropylene, for example the long-chain branched polypropylene, obtained by the instant process has a melt drawability, or a melt extensibility, of more than 150 mm/s, more preferably of more than 160 mm/s measured, yet more preferably more than 170 mm/s, measured by the Rheotens method as defined in the example section.

Furthermore, it is preferred that the branched polypropylene, for example the long-chain branched polypropylene, obtained by the process of the present technology has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined dye under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$. Accordingly, it is preferred that in the present technology the polypropylene has an $MFR_2$ in a range of 0.01 to 1000.00 g/10 min, more preferably of 0.01 to 100.00 g/10 min, still more preferred of 0.05 to 50 g/10 min. In a preferred embodiment, the MFR is in a range of 1.00 to 11.00 g/10 min. In another preferred embodiment, the MFR is in a range of 3.00 to 11.00 g/10 min.

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight (Mw) is the first moment of a plot of the weight of polymer in each molecular weight range against molecular weight.

The number average molecular weight (Mn) and the weight average molecular weight (Mw) as well as the molecular weight distribution are determined by size exclusion chromatography (SEC) using Waters Alliance GPCV 2000 instrument with online viscometer. The oven temperature is 140° C. Trichlorobenzene is used as a solvent.

It is preferred that the branched polypropylene, for example the long-chain branched polypropylene, obtained by the process of the present technology has a weight average molecular weight (Mw) from 10,000 to 2,000,000 g/mol, more preferably from 20,000 to 1,500,000 g/mol.

More preferably, the branched polypropylene, for example the long-chain branched polypropylene, obtained by the process of the present technology shall have a rather high pentad concentration, for example higher than 90%, more preferably higher than 92% and most preferably higher than 93%. In another preferred embodiment the pentad concentration is higher than 95%. The pentad concentration is an indicator for the narrowness in the stereoregularity distribution of the polypropylene.

In addition, it is preferred that the branched polypropylene, for example the long-chain branched polypropylene, obtained by the process of the present technology has a melting temperature Tm of higher than 120° C. It is in particular preferred that the melting temperature is higher than 120° C. if the polypropylene is a polypropylene copolymer as defined below. In turn, in case the polypropylene is a polypropylene homopolymer as defined below, it is preferred, that polypropylene has a melting temperature of higher than 150° C., more preferred higher than 154° C.

In a preferred embodiment the branched polypropylene, for example the long-chain branched polypropylene, obtained by the process of the present technology as defined above (and further defined below) is preferably unimodal. In another preferred embodiment the polypropylene as defined above (and further defined below) is preferably multimodal, more preferably bimodal.

"Multimodal" or "multimodal distribution" describes a frequency distribution that has several relative maxima. In particular, the expression "modality of a polymer" refers to the form of its molecular weight distribution (MWD) curve, for example the appearance of the graph of the polymer weight fraction as a function of its molecular weight. If the polymer is produced in the sequential step process, by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the branched polypropylene, for example the long-chain branched polypropylene, obtained by the process of the present technology is not unimodal it is preferably bimodal.

The branched polypropylene, for example the long-chain branched polypropylene, obtained by the process of the present technology can be homopolymer or a copolymer. Accordingly, the homopolymer as well as the copolymer can be a multimodal polymer composition.

The expression homopolymer used herein relates to a branched polypropylene, for example the long-chain branched polypropylene, that consists substantially, for example of at least 97 wt %, preferably of at least 99 wt %, and most preferably of at least 99.8 wt % of propylene units. In a preferred embodiment only propylene units in the branched polypropylene homopolymer, for example the long-chain branched polypropylene homopolymer, are detectable. The comonomer content can be determined with Fourier Transform infrared spectroscopy, as described below in the examples.

In case the branched polypropylene, for example the long-chain branched polypropylene, obtained by the process of the present technology is a branched propylene copolymer, it is preferred that the comonomer is ethylene. However, also other comonomers known in the art are suitable. Preferably, the total amount of comonomer, more preferably ethylene, in the propylene copolymer is up to 15 wt %, more preferably up to 10 wt %.

In a preferred embodiment, the branched polypropylene, for example the long-chain branched polypropylene, obtained by the process of the present technology is a propylene copolymer comprising a polypropylene matrix and an ethylene-propylene rubber (EPR).

The polypropylene matrix can be a homopolymer or a copolymer, more preferably multimodal, for example a bimodal homopolymer or a multimodal (for example bimodal) copolymer. In case the polypropylene matrix is a propylene copolymer, then it is preferred that the comonomer is ethylene or butene. However, also other comonomers known in the art are suitable. The preferred amount of comonomer, more preferably ethylene, in the polypropylene matrix is up to 8.00 Mol %. In case the propylene copolymer matrix has ethylene as the comonomer component, it is in particular preferred that the amount of ethylene in the matrix is up to 8.00 Mol %, more preferably less than 6.00 Mol %. In case the propylene copolymer matrix has butene as the comonomer component, it is in particular preferred that the amount of butene in the matrix is up to 6.00 Mol %, more preferably less than 4.00 Mol %.

Preferably, the ethylene-propylene rubber (EPR) in the total propylene copolymer is up to 80 wt %. More preferably the amount of ethylene-propylene rubber (EPR) in the total propylene copolymer is in the range of 20 to 80 wt %, still more preferably in the range of 30 to 60 wt %.

In addition, it is preferred that the branched polypropylene, for example the long-chain branched polypropylene, being a copolymer comprising a polypropylene matrix and an ethylene-propylene rubber (EPR) has an ethylene-propylene rubber (EPR) with an ethylene-content of up to 50 wt %.

In the following, the present technology is described by way of examples.

EXAMPLES

1. Definitions/Measuring Methods

The following definitions of terms and determination methods apply for the above general description of the present technology as well as to the below examples unless otherwise defined.

A. Strain Hardening Index

1. Acquiring the experimental data

Polymer is melted at T=180° C. and stretched with the SER Universal Testing Platform as described below at deformation rates of dε/dt=0.1, 0.3, 1.0, 3.0 and 10 s$^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device less than a threshold of 5×10$^{-3}$ mNm (Milli-Newtonmeter) which is required for precise and correct measurements, following check procedure is performed prior to each measurement:

- The device is set to test temperature (180° C.) for minimum 20 minutes without sample in presence of the clamps
- A standard test with 0.3 s$^{-1}$ is performed with the device on test temperature (180° C.)
- The torque (measured in mNm) is recorded and plotted against time
- The torque must not exceed a value of 5×10$^{-3}$ mNm to make sure that the friction of the device is in an acceptably low range Conducting the Experiment The device is heated for 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes +/−20 seconds before the experiment is started.

During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates dε/dt applied, the resulting tensile stress growth function $\eta_E^+$ (dε/dt, t) is plotted against the total Hencky strain ε to determine the strain hardening behaviour of the melt, see FIG. 1.

In the range of Hencky strains between 1.0 and 3.0, the tensile stress growth function $\eta_E^+$ can be well fitted with a function $$\eta_E^+(\dot{\varepsilon},\varepsilon)=c_1\cdot\varepsilon^{c_2}$$

where $c_1$ and $c_2$ are fitting variables. Such derived $c_2$ is a measure for the strain hardening behaviour of the melt and called Strain Hardening Index SHI. Dependent on the polymer architecture, SHI can

- be independent of the strain rate (linear materials, Y- or H-structures)
- increase with strain rate (short chain- or long chain-branched structures).

Figure 2:
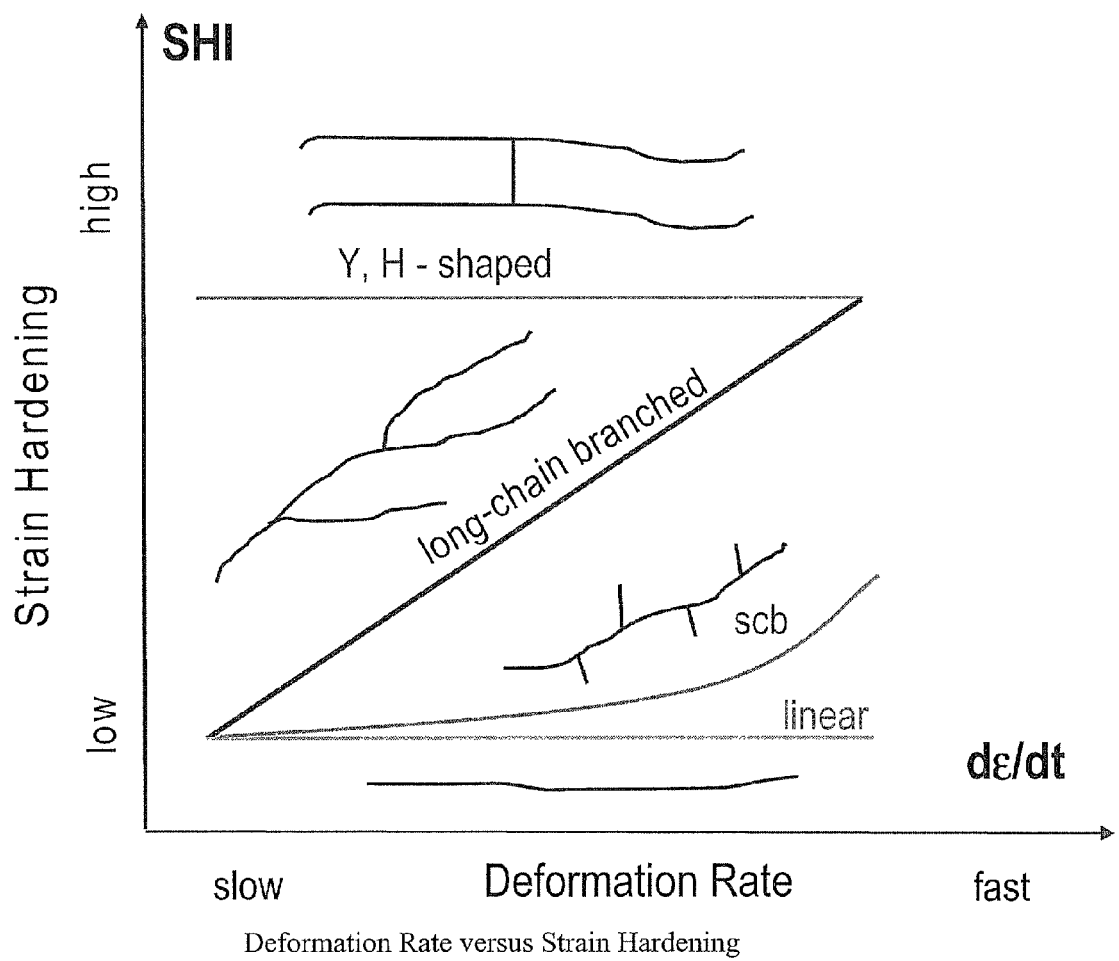
FIG. 2 is a graph depicting the deformation rate versus strain hardening.
Figure 3:
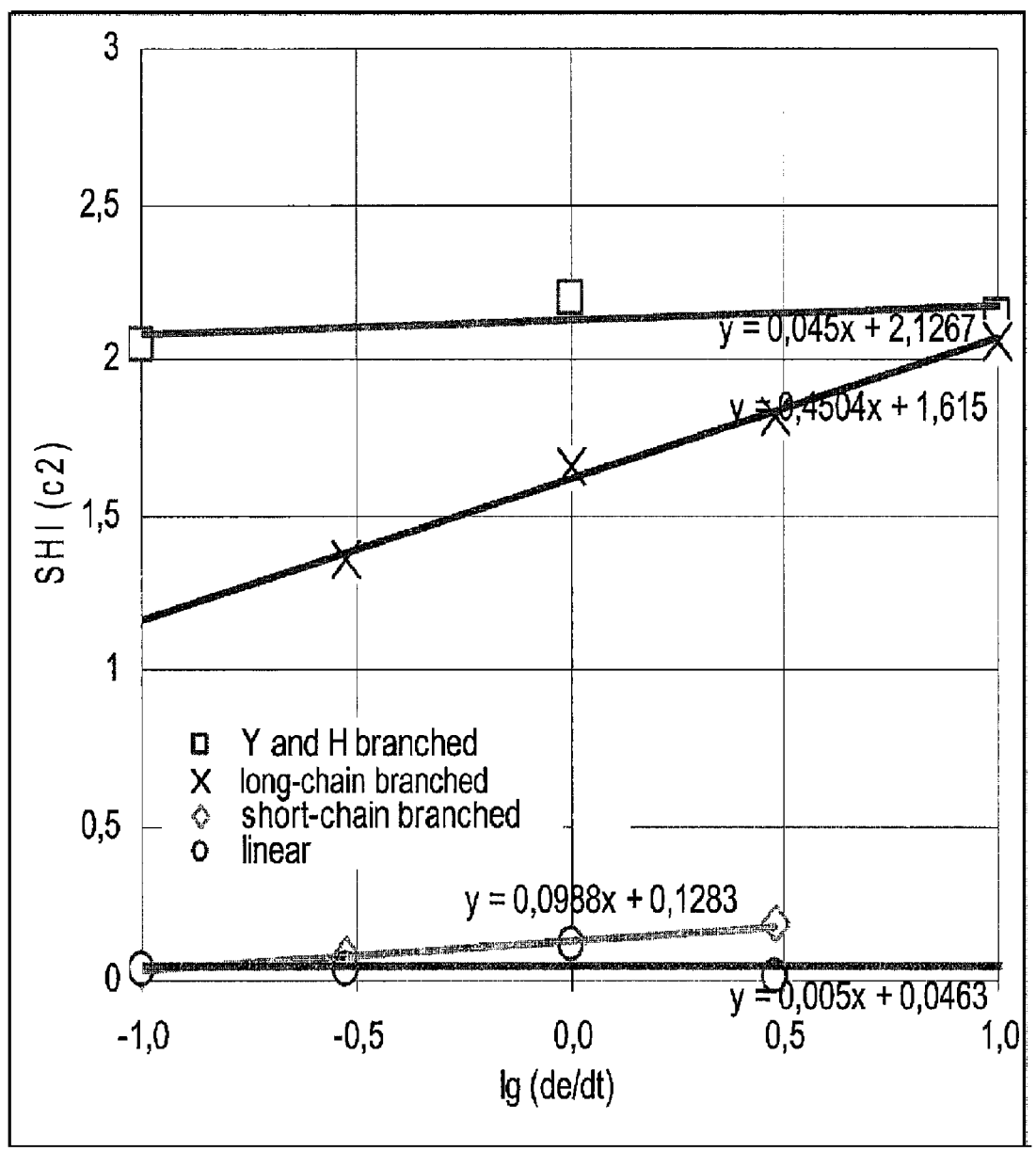
FIG. 3 is a graph depicting the deformation rate versus strain hardening for various examples.
Figure 4:
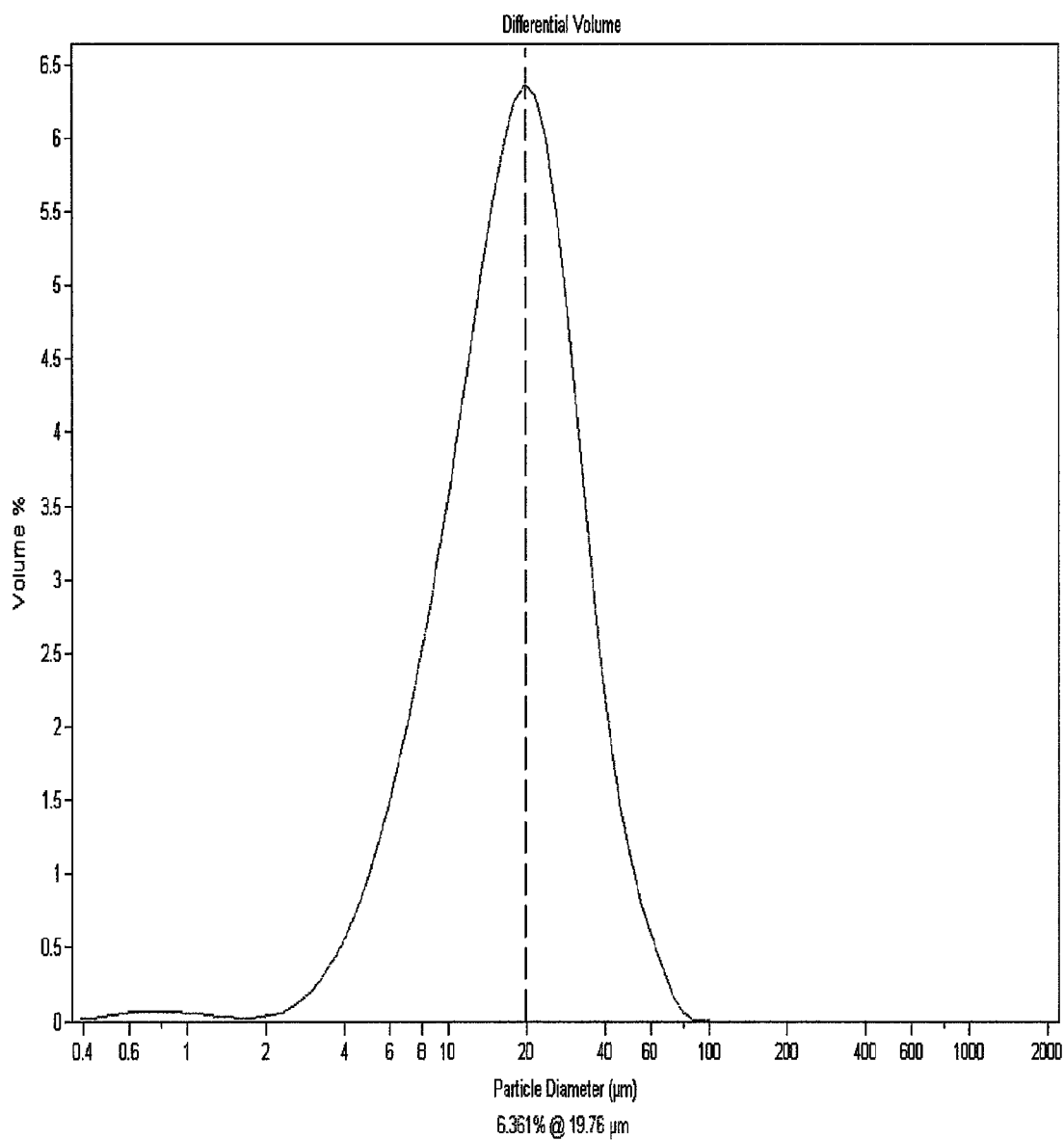
FIG. 4 is a diagram depicting the particle size distribution of the non-supported catalyst system via Coulter counter in accordance with one embodiment of the present technology.
Figure 5:
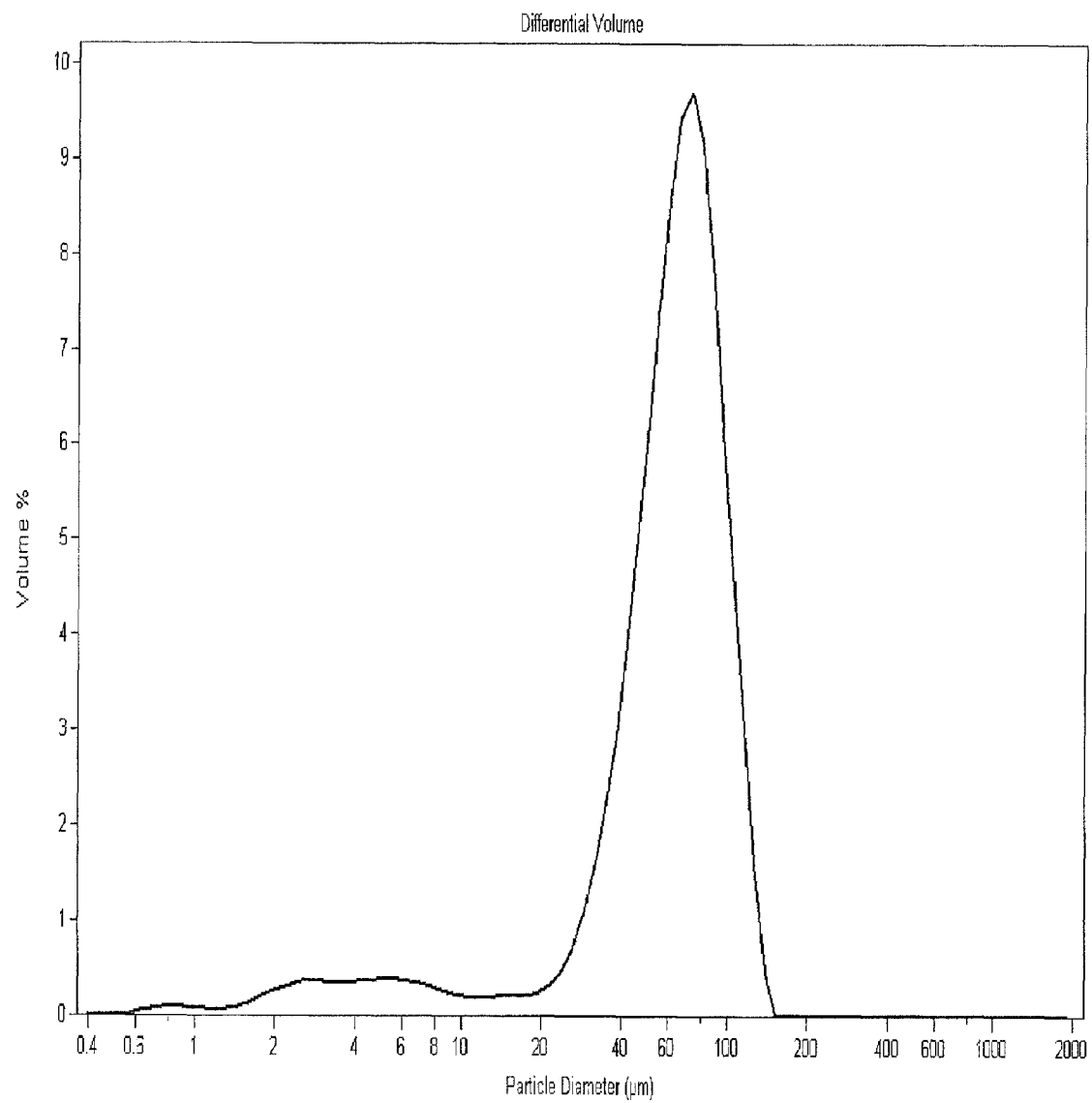
FIG. 5 is graph depicting the particle size distribution of the supported catalyst system via Coulter counter in accordance with one embodiment of the present technology.

This is illustrated in FIG. 2.

For polyethylene, linear (HDPE), short-chain branched (LLDPE) and long chain-branched structures (LDPE) are well known and hence they are used to illustrate the structural analytics based on the results on extensional viscosity. They are compared with a polypropylene with Y and H-structures with regard to their change of the strain-hardening behaviour as function of strain rate, see FIG. 2 and Table 1.

To illustrate the determination of SHI at different strain rates four polymers of known chain architecture are examined with the analytical procedure described above.

The first polymer is a H- and Y-shaped polypropylene homopolymer made according to EP 879 830 ("A") example 1 through adjusting the MFR with the amount of butadiene. It has a MFR230/2.16 of 2.0 g/10 min, a tensile modulus of 1950 MPa and a branching index g' of 0.7.

The second polymer is a commercial long-chain branched LDPE, Borealis "B", made in a high pressure process known in the art. It has a MFR190/2.16 of 4.5 and a density of 923 kg/m$^3$.

The third polymer is a short chain branched LLDPE, Borealis "C", made in a low pressure process known in the art. It has a MFR190/2.16 of 1.2 and a density of 919 kg/m$^3$.

The fourth polymer is a linear HDPE, Borealis "D", made in a low pressure process known in the art. It has a MFR190/2.16 of 4.0 and a density of 954 kg/m$^3$.

The four materials of known chain architecture are investigated by means of measurement of the transient elongational viscosity at 180° C. at strain rates of 0.10, 0.30, 1.0, 3.0 and 10 s$^{-1}$. Obtained data (transient elongational viscosity versus Hencky strain) is fitted with a function $$\eta_E^\pm = c_1 * \varepsilon^{c_2}$$

for each of the mentioned strain rates. The parameters $c_1$ and $c_2$ are found through plotting the logarithm of the transient elongational viscosity against the logarithm of the Hencky strain and performing a linear fit of this data applying the least square method. The parameter $c_1$ calculates from the intercept of the linear fit of the data $\lg(\eta_E^+)$ versus $\lg(\varepsilon)$ from $$c_1=10^{Intercept}$$

and $c_2$ is the strain hardening index (SHI) at the particular strain rate.

This procedure is done for all five strain rates and hence, SHI@0.1 s$^{-1}$, SHI@0.3 s$^{-1}$, SHI@1.0 s$^{-1}$, SHI@3.0 s$^{-1}$, SHI@10 s$^{-1}$ are determined, see FIG. 1.

TABLE 1

Strain hardening behaviour of different polymers

| dε/dt | Ig (dε/dt) | Property | Y and H branched PP A | long-chain branched LDPE B | Short-chain branched LLDPE C | Linear HDPE D |
|---|---|---|---|---|---|---|
| 0.1 | −1.0 | SHI@0.1 s$^{-1}$ | 2.05 | — | 0.03 | 0.03 |
| 0.3 | −0.5 | SHI@0.3 s$^{-1}$ | — | 1.36 | 0.08 | 0.03 |
| 1 | 0.0 | SHI@1.0 s$^{-1}$ | 2.19 | 1.65 | 0.12 | 0.11 |
| 3 | 0.5 | SHI@3.0 s$^{-1}$ | — | 1.82 | 0.18 | 0.01 |
| 10 | 1.0 | SHI@10 s$^{-1}$ | 2.14 | 2.06 | — | — |

From the strain hardening behaviour measured by the values of the SHI@1 s$^{-1}$ one can already clearly distinguish between two groups of polymers: Linear and short-chain branched have a SHI@1 s$^{-1}$ significantly smaller than 0.30. In contrast, the Y and H-branched as well as long chain-branched materials have a SHI@1 s$^{-1}$ significantly larger than 0.30.

Similar results can be observed when comparing different polypropylenes, for example polypropylenes with rather high branched structures have higher SHI-values, respectively, compared to their linear or short chain branched counterparts. Similar to the long-chain branched polyethylenes the polypropylenes of the present technology show a high degree of branching. However such polypropylenes are clearly distinguished in the SHI-values when compared to known long-chain branched polyethylenes. Without being bound on this theory, it is believed, that the different SHI-values are the result of a different branching architecture. For this reason the branched polypropylenes according to the present technology are designated as long-chain branched.

B. Further Measuring Methods

Particle size distribution: Particle size distribution is measured via Coulter Counter LS 200 at room temperature with n-heptane as medium.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$: measured according to ISO 1133 (230° C., 2.16 kg load).

Comonomer content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —CH$_2$— absorption peak (800-650 cm$^{-1}$) was measured with Perkin Elmer FTIR 1600 spectrometer. The method was calibrated by ethylene content data measured by $^{13}$C-NMR.

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Melt Strength and Melt Extensibility by Rheotens Measurement:

The strain hardening behaviour of polymers is analysed by Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded.

The test procedure is performed in a standard climatized room with controlled room temperature of T=23° C. The Rheotens apparatus is combined with an extruder/melt pump for continuous feeding of the melt strand. The extrusion temperature is 200° C.; a capillary die with a diameter of 2 mm and a length of 6 mm is used and the acceleration of the melt strand drawn down is 120 mm/s$^2$. The distance between die end and take off roll axis is 100 mm. The maximum points ($F_{max}$; $v_{max}$) at failure of the strand are characteristic for the strength and the drawability of the melt.

Stiffness Film TD (transversal direction), Stiffness Film MD (machine direction), Elongation at break TD and Elongation at break MD: these are determined according to ISO 527-3 (cross head speed: 1 mm/min).

Stiffness (tensile modulus) is measured according to ISO 527-2. The modulus is measured at a speed of 1 mm/min.

Intrinsic viscosity: is measured according to DIN ISO 1628/1, October 1999 (in Decalin at 135° C.).

Porosity: is measured according to DIN 66135

Surface area: is measured according to ISO 9277

Catalyst activity: The catalyst activity is determined by measurement of the polymer yield in dependence on catalyst feed and polymerisation time.

3. Examples

Example 1

(Inventive): Homopolymerisation

The polymerisation test are carried out in a continuous Borstar pilot plant. The silica supported dimethylsilyl[(2-methyl-(4'-tert.butyl)-4-phenyl-indenyl)(2-isopropyl-(4'-tert.butyl)-4-phenyl-indenyl)]zirconium dichloride [IUPAC: dimethylsilandiyl[2-methyl-(4'-tert.butyl)-4-phenyl-indenyl)(2-isopropyl-(4'-tert.butyl)-4-phenyl-indenyl)]zirconium dichloride] MAO catalyst is suspended in a mixture of oil and grease so that the final concentration is 2 wt.-%. The mixture (1.6 g catalyst/h) is continuously fed to the pre-polymerisation reactor together with 43 kg/h propylene and 1.6 g/h hydrogen. The reaction pressure is 53.7 bar, the temperature 35° C. and the residence time is 28 minutes. The pre-polymerised catalyst is then continuously fed to the loop reactor. Simultaneously 107 kg/h propylene is added. The polymerisation temperature in the loop is 65° C. and the pressure 53.3 bar. After a residence time of 41 minutes the polymer is transferred to a gas-phase reactor. The gas-phase reactor is operated at 70° C. and a pressure of 30.9 bar. The propylene feed is 71 kg/h. After a residence time of 3.3 hours the product discharged from the gas-phase reactor, separated from the un-reacted monomer and dried.

The dry catalyst powder had a pore volume of 320 m$^2$/g and a surface area of 1.6 cm$^3$/g. The product properties are summarised in table 4. The SHI and melt extensibility data show that long chain branches are formed.

Example 2

(Inventive): Ethylene/propylene Copolymerisation

The same catalyst is used as in example 1. The process conditions are summarised in table 3. Additional ethylene is fed to the loop reactor. The polymer is separated after the loop reactor. The polymer properties are summarised in table 4. The SHI and melt extensibility data show that long-chain branches are formed.

Example 3

(Inventive): Propylene homopolymerisation

A non supported Dimethylsilylbis[2-methyl-4-phenyl-indenyl]zirconium dichloride dimethylsilandiyl [IUPAC: dimethylsilandiylbis(2-methyl-4-phenyl-indenyl)zirconium dichloride] MAO catalyst is used for propylene polymerisation instead of the supported catalyst in the continuous Borstar pilot plant. The process conditions are summarised in table 3. The polymer is separated after the loop reactor. The polymer properties are summarised in table 4. The melt extensibility data show that long chain branches are formed.

TABLE 3

Process data

| Conditions | | Example 1 | Example 2 | Example 3 |
|---|---|---|---|---|
| Catalyst feed | [g/h] | 1.1 | 1.1 | 1.0 |
| Hydrogen feed | [g/h] | 1.6 | 3.49 | 1.0 |
| Pressure | [bar] | 53.7 | 54.1 | 53.7 |
| Residence time | [min] | 28 | 32 | 32 |
| Temperature | [° C.] | 30 | 40 | 35 |
| Temperature | [° C.] | 65 | 70 | 70 |
| Pressure | [bar] | 53.3 | 54.4 | 52.7 |
| Residence time | [min] | 60 | 46 | 43 |
| Propylene feed | [kg/h] | 150 | 150 | 152 |
| Ethylene feed | [kg/h] | 0 | 3.5 | 0 |
| Temperature | [° C.] | 70 | — | — |
| Residence time | [h] | 3.3 | — | — |
| Propylene feed | [kg/h] | 71 | — | — |

TABLE 4

Polymer properties

| Property | | Example 1 | Example 2 | Example 3 |
|---|---|---|---|---|
| MFR | [dl/g] | 8.5 | 2.8 | 24 |
| Melting temperature | [° C.] | 156 | 141 | 154 |
| Ethylene content | [mol %] | 0 | 4 | 0 |
| $M_w$ | [kg/mol] | 283 | 357 | 221 |
| $M_w/M_n$ | | 2.7 | 2.9 | 3.9 |
| Melt extensibility | [mm/s] | 174 | 198 | 200 |
| SHI | | 0.51 | 0.74 | — |
| Catalyst activity | [kg PP/ g cat × h] | 17 | 30 | 18 |
| Surface area polymer powder | [cm²/g] | <1 | <1 | <1 |

The invention claimed is:

1. A process for manufacturing a branched polypropylene, said branched polypropylene having a branching index g' of less than 1.00, the process comprising the step of polymerizing propylene and optionally one or more other comonomers under non-supercritical conditions in a reaction vessel, wherein:

a. the pressure during the polymerization of propylene and optionally one or more other comonomers in said reaction vessel is at least 45.4 bar;
   b. the temperature during the polymerization of propylene and optionally one or more other comonomers in said reaction vessel is below 90° C.; and
   c. the polymerization of propylene and optionally one or more other comonomers is conducted in said reaction vessel in the presence of a catalyst system having a surface area of not more than 350 m²/g, measured according to ISO 9277, and said catalyst system comprises a metallocene catalyst having zirconium as the transition metal.

2. The process of claim 1, wherein said catalyst system has a pore volume of below 4.00 cm³/g, measured according to DIN 66135 (N₂).

3. The process of claim 1, wherein said catalyst system has a catalyst activity of at least 10 kg PP/g cat×h.

4. The process of claim 1, wherein the metallocene catalyst comprises two cyclopentadienyl rings of the same chemical formula.

5. The process of claim 1, wherein the metallocene catalyst comprises two cyclopentadienyl rings of a different chemical formula.

6. The process of claim 1, wherein the metallocene catalyst is not silica supported.

7. The process of claim 1, wherein the metallocene catalyst has the formula (I):

$$(Cp)_2R_zZrX_2 \quad (I)$$

Wherein:

z is 0 or 1;

X is independently a monovalent anionic ligand;

R is a bridging group linking the two Cp-ligands; and the two Cp-ligands are selected, independently from each other, from the group consisting of unsubstituted cyclopentadienyl ring, unsubstituted indenyl ring, unsubstituted tetrahydroindenyl ring, unsubstituted fluorenyl ring, substituted cyclopentadienyl ring, substituted indenyl ring, substituted tetrahydroindenyl ring, and substituted fluorenyl ring.

8. The process of claim 7, wherein X is chlorine.

9. The process of claim 7, wherein:

z is 1; and

R is —Si(CH₃)₂—.

10. The process of claim 7, wherein the two Cp-ligands are selected, independently from each other, from the group consisting of unsubstituted indenyl ring and substituted indenyl ring.

11. The process of claim 7, wherein the substituents bonded to the ring are independently selected from the group consisting of $C_1$ to $C_6$ alkyl moiety, substituted aromatic ring moiety, unsubstituted aromatic ring moiety, substituted heteroaromatic ring moiety and unsubstituted heteroaromatic ring moiety.

12. The process of claim 7, wherein the two Cp-ligands are identical.

13. The process of claim 7, wherein the two Cp-ligands differ in their chemical structure.

14. The process of claim 1, wherein the metallocene catalyst is dimethylsilyl(2-methyl-4-phenyl-indenyl)₂zirconium dichloride.

15. The process of claim 7, wherein the metallocene catalyst is dimethylsilyl(2-methyl-4-phenyl-indenyl)₂zirconium dichloride.

16. The process of claim 1, wherein the metallocene catalyst is dimethylsilyl[(2-methyl-(4'-tert.butyl)-4-phenyl-indenyl)(2-isopropyl-(4'-tert.butyl)-4-phenyl-indenyl)]zirconium dichloride.

17. The process of claim 7, wherein the metallocene catalyst is dimethylsilyl[(2-methyl-(4'-tert.butyl)-4-phenyl-indenyl)(2-isopropyl-(4'-tert.butyl)-4-phenyl-indenyl)]zirconium dichloride.

18. The process of claim 1, wherein the comonomer is ethylene.

19. The process of claim 1, wherein the process is a bulk polymerization.

20. The process of claim 1, wherein the process is a combination of bulk polymerisation and gas phase polymerization.

21. The process of claim 1, wherein the obtained branched polypropylene has a pore volume below 5.00 cm$^3$/g measured according to DIN 66135 (N$_2$).

22. The process of claim 1, wherein the obtained branched polypropylene has a melt drawability of more than 150 mm/s.

23. The process of claim 1, wherein the obtained branched polypropylene has a strain hardening index of at least 0.15 measured at a deformation rate, dε/dt, of 1.00 s$^{-1}$ at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3.

24. A process for manufacturing a branched polypropylene, said branched polypropylene having a branching index g' of less than 1.00, the process comprising the step of polymerizing propylene and optionally one or more other comonomers under non-supercritical conditions in a reaction vessel, wherein
  a. the pressure during the polymerization of propylene and optionally one or more other comonomers in said reaction vessel is at least 45.4 bar;
  b. the temperature during the polymerization of propylene and optionally one or more other comonomers in said reaction vessel is below 90° C.; and
  c. the polymerization of propylene and optionally one or more other comonomers is conducted in said reaction vessel in the presence of a catalyst system having pore volume of below 3.50 cm$^3$/g, measured according to DIN 66135 (N$_2$), and said catalyst system comprises a metallocene catalyst having zirconium as the transition metal.

25. The process of claim 24, wherein said catalyst system has a surface area of not more than 350 m$^2$/g measured according to ISO 9277 (N$_2$).

* * * * *